(12) United States Patent
Sang et al.

(10) Patent No.: US 10,705,716 B2
(45) Date of Patent: Jul. 7, 2020

(54) DISPLAY APPARATUS

(71) Applicant: Samsung Display Co., Ltd., Yongin-si, Gyeonggi-do (KR)

(72) Inventors: Hyeonjeong Sang, Bucheon-si (KR); Heeyoung Lee, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/258,487

(22) Filed: Jan. 25, 2019

(65) Prior Publication Data

US 2019/0155475 A1  May 23, 2019

Related U.S. Application Data

(60) Continuation of application No. 15/965,780, filed on Apr. 27, 2018, now Pat. No. 10,209,878, which is a
(Continued)

(30) Foreign Application Priority Data

Mar. 5, 2015 (KR) .................. 10-2015-0030996

(51) Int. Cl.
*G06F 3/0487* (2013.01)
*G06F 1/16* (2006.01)
(Continued)

(52) U.S. Cl.
CPC .......... *G06F 3/0487* (2013.01); *G06F 1/1626* (2013.01); *G06F 1/1652* (2013.01);
(Continued)

(58) Field of Classification Search
CPC .... G06F 3/0487; G06F 1/1626; G06F 1/1652; G06F 1/1694; G06F 1/3206; G06F 1/3265; G06F 3/013
See application file for complete search history.

(56) References Cited

U.S. PATENT DOCUMENTS 9,612,621 B2  4/2017 Lee et al.
10,296,189 B2  5/2019 Amemiya et al.
(Continued)

FOREIGN PATENT DOCUMENTS

CN  102122227 A  7/2011
EP  2 741 176 A2  6/2014
(Continued)

OTHER PUBLICATIONS

EPO Search Report dated Jul. 13, 2016, for corresponding European Patent Application No. 16153019.1 (11 pages).
(Continued)

*Primary Examiner* — Sejoon Ahn

(74) *Attorney, Agent, or Firm* — Lewis Roca Rothgerber Christie LLP

(57) ABSTRACT

A display apparatus includes: a display panel; a deformation sensor configured to sense a bending of the display panel; and a controller configured to control the display panel, wherein the controller is configured to: control displaying a plurality of objects on the display panel; detect the bending of the display panel through the deformation sensor; divide the display panel into a first area and a second area with respect to a bending line defined by the bending; divide the objects into a first object corresponding to the first area and a second object corresponding to the second area according to the bending; and move the first and second objects in first and second directions, respectively, according to the bending.

18 Claims, 15 Drawing Sheets

Related U.S. Application Data division of application No. 14/880,964, filed on Oct. 12, 2015, now Pat. No. 9,959,030.

(51) Int. Cl.

| | | |
|---|---|---|
| *G06F 1/3206* | (2019.01) | |
| *G06F 1/3234* | (2019.01) | |
| *G06F 3/01* | (2006.01) | |
| *H04M 1/02* | (2006.01) | |
| *G06F 3/0488* | (2013.01) | |
| *G06F 3/0481* | (2013.01) | |
| *G06F 3/0484* | (2013.01) | |
| *G06T 3/20* | (2006.01) | |
| *H04M 1/725* | (2006.01) | |

(52) U.S. Cl.
CPC .......... *G06F 1/1694* (2013.01); *G06F 1/3206* (2013.01); *G06F 1/3265* (2013.01); *G06F 3/013* (2013.01); *G06F 3/017* (2013.01); *G06F 3/0484* (2013.01); *G06F 3/04817* (2013.01); *G06F 3/04886* (2013.01); *G06T 3/20* (2013.01); *H04M 1/0268* (2013.01); *G06F 2203/0381* (2013.01); *G06F 2203/04803* (2013.01); *G06F 2203/04806* (2013.01); *H04M 1/72569* (2013.01); *H04M 2250/22* (2013.01); *Y02D 10/153* (2018.01)

(56) References Cited

U.S. PATENT DOCUMENTS

| | | | |
|---|---|---|---|
| 2005/0083351 A1* | 4/2005 | Kawamoto | H04M 1/021 345/660 |
| 2009/0160792 A1 | 6/2009 | Morohoshi et al. | |
| 2010/0011291 A1 | 1/2010 | Nurmi | |
| 2010/0182265 A1 | 7/2010 | Kim et al. | |
| 2011/0057873 A1 | 3/2011 | Geissler et al. | |
| 2011/0169868 A1 | 7/2011 | Amemiya et al. | |
| 2012/0319960 A1 | 12/2012 | Kildal et al. | |
| 2013/0009903 A1 | 1/2013 | Shiota | |
| 2013/0050126 A1* | 2/2013 | Kimura | G02F 1/13338 345/173 |
| 2013/0127912 A1* | 5/2013 | Lin | G06F 3/0487 345/659 |
| 2013/0135182 A1 | 5/2013 | Jung et al. | |
| 2013/0154971 A1 | 6/2013 | Kang et al. | |
| 2013/0201115 A1 | 8/2013 | Heubel | |
| 2013/0205142 A1* | 8/2013 | Jung | G06F 1/1677 713/300 |
| 2013/0215088 A1 | 8/2013 | Son et al. | |
| 2013/0265257 A1 | 10/2013 | Jung et al. | |
| 2013/0265260 A1 | 10/2013 | Seo et al. | |
| 2013/0300682 A1 | 11/2013 | Choi et al. | |
| 2014/0015743 A1* | 1/2014 | Seo | G06F 1/1652 345/156 |
| 2014/0160078 A1* | 6/2014 | Seo | G06F 3/017 345/175 |
| 2014/0176421 A1 | 6/2014 | Chen | |
| 2014/0218321 A1 | 8/2014 | Lee et al. | |
| 2015/0015511 A1* | 1/2015 | Kwak | G06F 3/0412 345/173 |
| 2015/0016726 A1* | 1/2015 | Sugiura | G06F 3/04883 382/189 |
| 2015/0022436 A1* | 1/2015 | Cho | G06F 1/1652 345/156 |
| 2015/0022472 A1 | 1/2015 | Jung et al. | |
| 2015/0128728 A1 | 5/2015 | Salo et al. | |
| 2016/0259514 A1* | 9/2016 | Sang | G06F 3/04817 |

FOREIGN PATENT DOCUMENTS

| | | |
|---|---|---|
| JP | 2006-243621 A | 9/2006 |
| JP | 2010-175999 A | 8/2010 |
| JP | 2013-196623 A | 9/2013 |
| KR | 10-2010-0024589 A | 3/2010 |
| KR | 10-2010-0039194 A | 4/2010 |
| KR | 10-2010-0082451 A | 7/2010 |
| KR | 10-2010-0092222 A | 8/2010 |
| KR | 10-2011-0038980 A | 4/2011 |
| KR | 10-2012-0006187 A | 1/2012 |
| KR | 10-2012-0015890 A | 2/2012 |
| KR | 10-2012-0032659 A | 4/2012 |
| KR | 10-2014-0008177 A | 1/2014 |
| KR | 10-2014-0025931 A | 3/2014 |
| KR | 10-2014-0046346 A | 4/2014 |
| KR | 10-2014-0052281 A | 5/2014 |
| KR | 10-2014-0096861 A | 8/2014 |
| WO | 2011/135944 A1 | 11/2011 |

OTHER PUBLICATIONS

Extended European Search Report for corresponding European Patent Application No. 18209663.6, dated Apr. 10, 2019, 8 pages.

\* cited by examiner

DISPLAY APPARATUS

CROSS-REFERENCE TO RELATED APPLICATION

This application is a continuation of U.S. patent application Ser. No. 15/965,780, filed Apr. 27, 2018, which is a divisional of U.S. patent application Ser. No. 14/880,964, filed Oct. 12, 2015, now U.S. Pat. No. 9,959,030, which claims priority to and the benefit of Korean Patent Application No. 10-2015-0030996, filed Mar. 5, 2015, the entire content of all of which is incorporated herein by reference.

BACKGROUND

1. Field

Aspects of embodiments of the present invention relate to a display apparatus.

2. Description of the Related Art

Electronic equipment, such as a smart phone, a digital camera, a notebook computer, a navigation device, a smart television, etc., includes a display panel to display an image.

In general, a flat display panel having thin thickness and light weight has been widely used as the display panel. For instance, various display panels, such as liquid crystal display panels, organic light emitting display panels, electro wetting display panels, plasma display panels, electrophoretic display panels, and the like, have been used as display panels for electronic devices.

In recent years, flexible display panels that are bendable have been developed. Flexible display panels are applicable to not only IT-related products but also products such as cloth and paper. When using flexible display panels, a foldable display apparatus configured to be folded while being carried or stored and unfolded while displaying an image has been developed.

SUMMARY

Aspects of embodiments of the present invention relate to a display apparatus. For example, aspects of some embodiments of the present invention relate to a display apparatus that is bendable and foldable.

Aspects of some embodiments of the present invention include a display apparatus having improved convenience and usability.

According to aspects of embodiments of the present invention, a display apparatus includes: a display panel; a deformation sensor configured to sense a bending of the display panel; and a controller configured to control the display panel, wherein the controller is configured to: control displaying a plurality of objects on the display panel; detect the bending of the display panel through the deformation sensor; divide the display panel into a first area and a second area with respect to a bending line defined by the bending; divide the objects into a first object corresponding to the first area and a second object corresponding to the second area according to the bending; and move the first and second objects in first and second directions, respectively, according to the bending.

The first direction may be a direction opposite to the bending line with respect to the first object and the second direction may be a direction opposite to the bending line with respect to the second object.

The first direction may be toward the bending line with respect to the first object and the second direction may be toward the bending line with respect to the second object.

A moving speed of the first and second objects may be determined based on a bending angle of the bending.

A moving distance of the first and second objects may be determined based on a bending angle of the bending.

The display apparatus may further include a grip sensor configured to sense a grip by a user's hand, the controller may be configured to define grip areas corresponding to areas gripped by the user's hand using the grip sensor, the first object may move to a grip area defined in the first area among the grip areas, and the second object may move to a grip area defined in the second area among the grip areas.

The controller may be configured to detect an unbending of the display panel using the deformation sensor and to return the first and second objects to original positions of the first and second objects before the display panel is bent.

A moving speed when the first and second objects are respectively returned to the original positions may be slower than a moving speed when the first and second objects respectively move to the first and second directions.

According to aspects of embodiments of the present invention, a display apparatus includes: a display panel; a deformation sensor configured to sense a bending of the display panel; and a controller configured to: control the display panel and detect the bending using the deformation sensor; control displaying a first icon corresponding to a first application in a first icon arrangement area; detect a first touch input selecting the first icon; detect a first bending of the display panel; determine that an execution command executing the first application is input according to the first bending to generate a first control signal; and execute the first application in response to the first control signal.

The controller may be configured to define an execution area distinct from the first icon arrangement area in the display panel on the basis of the first bending and to display an execution screen of the first application in the execution area.

The controller may be configured to: detect a second bending of the display panel; determine that an execution command controlling a size of the execution screen of the first application based on the second bending to generate a second control signal; and control the size of the execution screen of the first application in response to the second control signal.

The controller may be configured to detect a bending activation input generated by a user and to control the size of the execution screen of the first application while the bending activation input is input.

The bending activation input may correspond to an operation that maintains a touch on the first icon.

When a first bending angle between the first icon arrangement area and the execution area becomes smaller, the size of the execution screen of the first application may decrease, and when the first bending angle becomes greater, the size of the execution screen of the first application may increase.

The controller may be configured to determine that the execution command of the first application is input when the first bending angle between the first icon arrangement area and the execution area becomes smaller.

The controller may be configured to detect a first movement of the first icon arrangement area and a second movement of the execution area and to determine that the execution command of the first application is input according to the first movement, the second movement, and the first bending.

When the first icon arrangement area is fixed, the first movement may not be detected, and the second movement may be a movement of a second icon arrangement area to allow a first bending angle between the first and second icon arrangement areas to be small, the controller may be configured to determine that the execution command of the first application is input.

The controller may be configured to: display a second icon corresponding to a second application in a second icon arrangement area of the display panel; move the second icon to the first icon arrangement area; and display the second icon through the first icon arrangement area when the execution area is overlapped with the second icon arrangement area after the first bending.

The controller may be configured to: detect a third bending of the display panel; determine a command moving and displaying the execution screen of the first application to and in the first icon arrangement area according to the third bending; generate a third control signal; and move and displays the execution screen of the first application to and in the first icon arrangement area in response to the third control signal.

The controller may be configured to detect a first movement of the first icon arrangement area and a second movement of the execution area and to determine that the command moving and displaying the execution screen of the first application to and in the first icon arrangement area is input according to the first movement, the second movement, and the third bending.

When the first icon arrangement area is fixed, the first movement is not detected, and the second movement is a movement of the execution area to allow the first bending angle between the first icon arrangement area and the execution area to be small, the controller may be configured to determine that the command moving and displaying the execution screen of the first application to and in the first icon arrangement area is input.

According to aspects of embodiments of the present invention, a display apparatus includes: a display panel; a deformation sensor configured to sense a bending of the display panel; and a controller configured to: control the display panel and detect the bending using the deformation sensor; divide the display panel into a visible area perceived by a user and a non-visible area not perceived by the user due to the bending, which are defined in the display panel, according to the bending of the display panel; and drive the non-visible area in a power saving mode.

The controller may be configured to control a size of an object so as to correspond to the visible region displayed in the display panel before the bending of the display panel, after the bending of the display panel and to move and display the object in the visible area.

The controller may be configured to display an image having a black grayscale at the non-visible area in the power saving mode.

The controller may be configured to determine that the display panel is in a folded state according to the bending and to turn off the display panel when a bending angle of the bending of the display panel is smaller than a predetermined turn-off angle while the display panel is being folded.

The controller may be configured to determine that the display panel is in an unfolded state and to turn on the display panel when the bending angle is greater than a predetermined turn-on angle while the display panel is in unfolded state, and the turn-on angle is smaller than the turn-off angle.

The display apparatus may further include a gaze sensor configured to sense a gaze of the user, and the controller may be configured to detect a user's gaze using the gaze sensor and to divide the visible area and the non-visible area based on the bending and the user's gaze.

The display panel may be folded two times at first and second bending angles when the display panel is bent, and the controller may be configured to divide the visible area and the non-visible area according to the first and second bending angles.

The display panel may be bent along a first bending line corresponding to the first bending line and a second bending line corresponding to the second bending line when the display panel is in the first bending, the controller may be configured to define first, second, and third areas with respect to the first and second bending lines, at least one area of the first, second, and third areas may be in the non-visible area, remaining areas of the first, second, and third areas may be in the visible area, the first bending line may be defined between the first and second areas, and the second bending line may be defined between the second and third areas.

When the first bending angle is smaller than the second bending angle, the first and second areas may be included in the non-visible area by the controller and the third area may be included in the visible area by the controller.

When the second bending angle is smaller than the first bending angle, the first and second areas may be included in the non-visible area by the controller and the third area may be included in the visible area by the controller.

According to the above, the display apparatus according to some embodiments of the present invention may detect the bending and display the image in accordance with the bending. Therefore, the user applies various inputs to the display apparatus by bending the display apparatus, and thus the user controls the display apparatus. Thus, the convenience and usability of the display apparatus may be improved.

BRIEF DESCRIPTION OF THE DRAWINGS

The above and other features of the present invention will become readily apparent by reference to the following detailed description when considered in conjunction with the accompanying drawings wherein.

DETAILED DESCRIPTION

Figure 1:
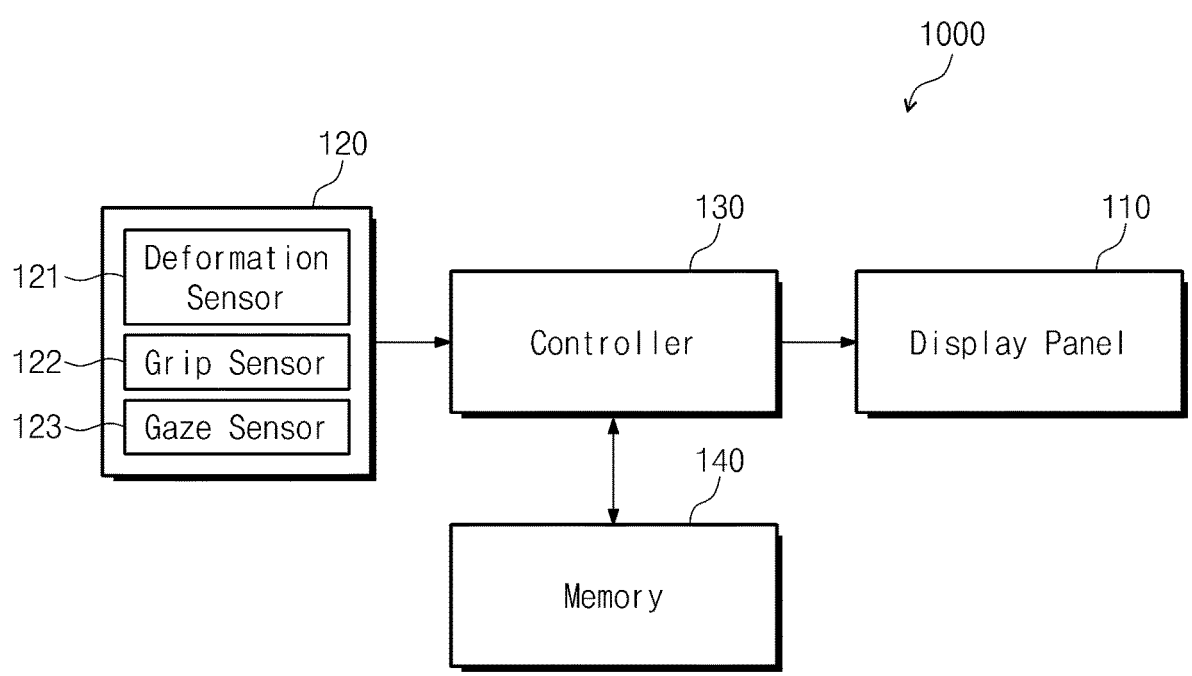
FIG. 1 is a block diagram showing a display apparatus according to an example embodiment of the present invention.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the example embodiments of the present invention.

Hereinafter, the present invention will be explained in more detail with reference to the accompanying drawings.

FIG. 1 is a block diagram showing a display apparatus 1000 according to an example embodiment of the present invention.

Referring to FIG. 1, the display apparatus 1000 includes a display panel 110, a sensing part 120, a controller 130, and a memory 140.

The display apparatus 1000 may be, but is not limited to, a flexible display apparatus. Accordingly, the display apparatus 1000 may be deformed by an external force applied thereto. For example, the display apparatus 1000 may be bent, folded, rolled, or stretched by an external force.

Hereinafter, the term of "bending of the display apparatus" used herein means a state that the display apparatus 1000 is bent at an angle (e.g., a predetermined angle or more) such that two areas of the display apparatus 1000 face each other.

Elements of the display apparatus 1000 include materials with flexibility and have structure appropriate to the flexibility. For example, the display panel 110 may include a plastic material with flexibility, and thus the display panel 110 may be deformed by the external force.

The display panel 110 includes a plurality of pixels arranged in a matrix arrangement. Each pixel displays a unit image. The flexible display panel has a resolution determined depending on the number of the pixels arranged on the display panel 110. The display panel 110 displays visual information, such as a text, a video, a photograph, a two-dimensional image, a three-dimensional image, etc., as the image.

The display panel 110 may include an organic light emitting display panel, a liquid crystal display panel, a plasma display panel, an electrophoretic display panel, or an electrowetting display panel.

The display panel 110 may be, but is not limited to, a display panel that senses a touch event. In this case, the display panel 110 includes a touch screen panel. The touch screen panel includes a touch sensing surface, a sensor, or a set of sensors to receive an input from a user on the basis of a haptic and/or physical touch. The touch screen panel senses a touch occurring on the display panel 110, a movement of the touch, or a cut of the touch and generates touch information.

The sensing part 120 includes a deformation sensor 121, a grip sensor 122, and a gaze sensor 123.

The deformation sensor 121 senses deformation of the display panel 110. The deformation sensor 121 may include various sensors (e.g., a pressure sensor, a strain gauge sensor, etc.) to sense pressure and strain occurring on the display apparatus 1000, which are caused by the deformation of the display apparatus 1000. In addition, the deformation sensor 121 may include a gyro sensor, an acceleration sensor, a geomagnetic sensor, etc., to sense movements, such as displacement, rotation, etc., of the display panel 110. Further, the deformation sensor 121 may include a proximity sensor. The sensors are provided to the display apparatus 1000 or the display panel 110 and sense a variation in physical quantity generated at positions corresponding to the sensors.

The deformation sensor 121 senses the deformation of the display apparatus 1000 using the sensors and generates deformation information. The deformation information may include various information, such as a deformation position, a deformation region, a deformation direction, a deformation angle, a deformation intensity, a deformation speed, a number of times of deformation, a time point of the deformation, a maintain time of the deformation, etc., of the display apparatus 1000.

For instance, when the display panel 110 is bent by a user, the deformation sensor 121 senses the bending of the display panel 110 and generates bending information. The bending information may include various information, such as a bending position, a bending region, a bending direction, a bending angle, a bending intensity, a bending speed, a number of times of bending, a time point of the bending, a maintain time of the bending, etc., of the display apparatus 1000.

The deformation sensor 121 senses a bending line formed by the bending and a state of change of the bending line on the basis of the bending information. In detail, the deformation sensor 121 recognizes the bending line on the basis of a distribution of strain output from the strain gauge sensor, a distribution of pressure sensed by the pressure sensor, and variations of the distributions of the strain and pressure. Here, the term "bending line" used herein means an imaginary line obtained by connecting positions each at which a degree of the bending is largest in the area in which the bending occurs.

The grip sensor 122 senses the user's grip and generates grip information. For instance, when the user grips the display apparatus 1000 by his hands to use the display apparatus 1000, the grip sensor 122 generates the grip information including a grip position, a grip region, a grip pressure, a time point of the grip, and/or a maintain time of the grip, etc.

The grip sensor 122 is realized by a sensor used to sense the user's grip, but it should not be limited thereto or thereby. That is, the grip sensor 122 may be realized by the touch screen panel. In more detail, the grip sensor 122 may generate the grip information on the basis of (a) haptic or/and physical touch(s) sensed by the touch screen panel.

The gaze sensor 123 senses a gaze of the user and generates gaze information. When the user watches the display apparatus 1000 to use the display apparatus 1000, the gaze sensor 123 generates the gaze information including, for example, a position of user's eye, a position of gaze, a gaze direction, etc.

For instance, a face modeling technology may be utilized with the gaze sensor 123. The face modeling technology is an analyzing process of converting face images obtained by a camera into digital information for processing and transmitting. Either an active shape modeling (ASM) method or an active appearance modeling (AAM) may be used as the face modeling technology. In addition, the gaze sensor 123 may use the identified eyeball image to determine the movement of the eyeballs. In addition, the gaze sensor 123 may use the movement of the eyeballs to sense the direction in which the user gazes, and compare pre-stored information about the display panel 110 with the direction in which the user gazes, thereby determining the area at which the user gazes.

The controller 130 controls the display panel 110. The controller 130 receives image information from an external source, processes the image information, and controls the display panel 110 to allow images corresponding to the image information to be displayed through the display panel 110.

In addition, the controller 130 displays a user interface through the display panel 110 and controls an operation of the user interface in response to commands corresponding to the user's inputs.

As an example, the controller 130 detects the deformation of the display panel 110 and the display apparatus 1000, the grip of the user, and the gaze of the user on the basis of the deformation information, the grip information, and the gaze information, which are generated by the sensing part 120, and operates and controls the displayed image and the user interface on the basis of the deformation of the display panel 110 and the display apparatus 1000, the grip of the user, and the gaze of the user.

In addition, the controller 130 detects the touch input by the user on the basis of the touch information generated by the display panel 110. The controller 130 converts the detected touch to correspond to objects of the user interface displayed on the display panel 110.

The memory 140 includes a high-speed random access memory, such as a dynamic random access memory (DRAM), a static random access memory (SRAM), a double data rate synchronous dynamic random access memory (DDR RAM), etc., and includes at least one of a magnetic disc storage unit, an optical disc storage unit, and a flash memory unit, or a non-volatile memory such as a non-volatile semiconductor storage unit. The memory 140 stores sets of commands and/or data structures, software program required to drive the display apparatus 1000, and applications operated in the display apparatus 1000.

Hereinafter, for the convenience of explanation, operations of the display panel 110, the sensing part 120, the controller 130, and the memory 140 are assumed to be the same as those of the display apparatus 1000. Accordingly, the operation of the display apparatus 1000 described hereinafter may be performed by any one of elements of the display apparatus 1000 or interactions of the elements of the display apparatus 1000.

In addition, when the display apparatus 1000 is deformed, the deformation of the display panel 110 is substantially the same as the deformation of the display apparatus 1000, and thus the deformation of the display apparatus 1000 will be used as the same meaning as the deformation of the display panel 110.

Figure 2A:
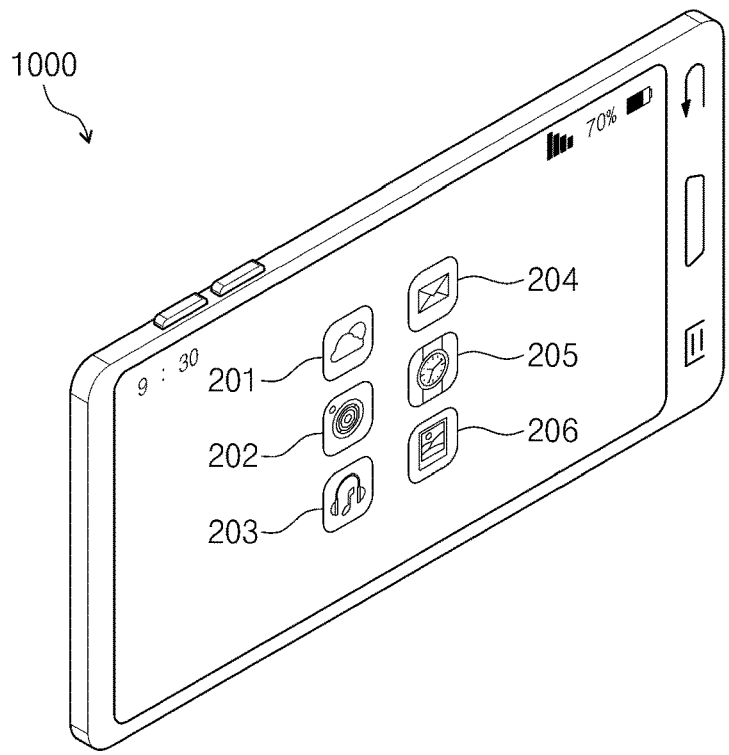
FIGS. 2A and 2B are views showing an operation providing a user interface corresponding to a deformation of a display apparatus according to an example embodiment of the present invention.
Figure 2B:
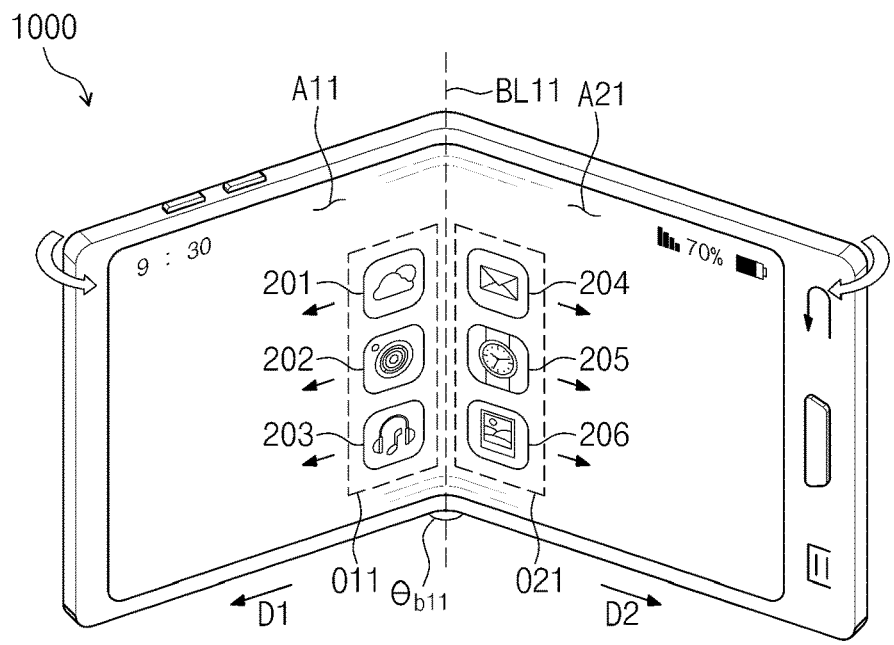

FIGS. 2A and 2B are views showing an operation providing the user interface corresponding to the deformation of the display apparatus 1000 according to an example embodiment of the present invention.

FIG. 2A shows the display apparatus 1000 in an unbending state. The display apparatus 1000 displays the objects while being in the unbending state. As an example, the objects may be images forming the user interface and an execution screen of applications.

The user interacts with the display apparatus 1000 through the user interface or controls the software program operated in the display apparatus 1000. The objects of the user interface include a plurality of icons or soft keys and indicators representing information about the display apparatus 1000.

In the present example embodiment, the icons include a weather icon 201, a camera icon 202, a music icon 203, a mail icon 204, a watch icon 205, and a photograph icon 206. The indicators are displayed on an upper portion of the display apparatus 1000 and include a time indicator, a signal intensity indicator, a battery state indicator, etc.

Referring to FIG. 2B, the display apparatus 1000 is bent along a first bending line BL11 by the user. In this case, the display apparatus 1000 includes a first area A11 and a second area A21, which are respectively defined at both sides of the first bending line BL11.

When the display apparatus 1000 is bent, the display apparatus 1000 senses the bending and generates the bending information about the bending, and the display apparatus 1000 detects the bending on the basis of the bending information. The display apparatus 1000 detects the first bending line BL11 on the basis of the detected bending, and thus the first and second areas A11 and A21 are distinct from each other.

The display apparatus 1000 divides the icons into groups on the basis of the bending. For instance, the display apparatus 1000 divides the icons into a first object O11 including the weather icon 201, the camera icon 202, and the music icon 203, which are arranged in a left side of the first bending line BL11 and a second object O21 including the mail icon 204, the watch icon 205, and the photograph icon 206, which are arranged in a right side of the first bending line BL11.

Then, the display apparatus 1000 moves the first and second objects O11 and O21. For example, the display apparatus 1000 may move the first object O11 toward a first direction D1 and move the second object O21 toward a second direction D2.

The first and second directions D1 and D2 may be defined by the display apparatus 1000. The first direction D1 is a direction opposite to the first bending line BL11 with respect to the first object O11 and the second direction D2 is a direction opposite to the first bending line BL11 with respect to the second object O21. When the first and second objects O11 and O21 move toward the first and second directions D1 and D2, respectively, the first and second objects O11 and O21 are farther away from each other.

However, they should not be limited thereto or thereby. That is, the first and second objects O11 and O21 may move to opposite directions respectively opposite to the first and second directions D1 and D2. In this case, the first and second objects O11 and O21 are close to each other.

The display apparatus 1000 may determine a moving speed of each of the first and second objects O11 and O21 on the basis of a bending angle $\theta_{b11}$. For instance, when the bending angle $\theta_{b11}$ is smaller than an angle (e.g., a predetermined angle), the moving speed of each of the first and second objects O11 and O21 may be greater than the moving speed of each of the first and second objects O11 and O21 when the bending angle $\theta_{b11}$ is greater than the angle (e.g., the predetermined angle).

In addition, the display apparatus may determine a moving distance of each of the first and second objects O11 and O21 on the basis of a bending angle $\theta_{b11}$. For instance, when the bending angle $\theta_{b11}$ is smaller than the angle (e.g., the predetermined angle), the moving distance of each of the first and second objects O11 and O21 may be greater than the moving distance of each of the first and second objects O11 and O21 when the bending angle $\theta_{b11}$ is greater than the angle (e.g., the predetermined angle).

When the display apparatus 1000 is unbent again after being bent, the display apparatus 1000 may detect the unbending thereof and control the first and second objects O11 and O21 to return to their original positions in accordance with the unbending.

In the present example embodiment, the moving speed when the first and second objects O11 and O21 return to their original positions may be slower than the moving speed when the first and second objects O11 and O21 move toward the first and second directions D1 and D2 in accordance with the bending. Therefore, the user controls the positions of the first and second objects O11 and O21 using the bending and unbending of the display apparatus 1000, and thus the convenience and usability of the display apparatus 1000 may be improved.

Figure 3:
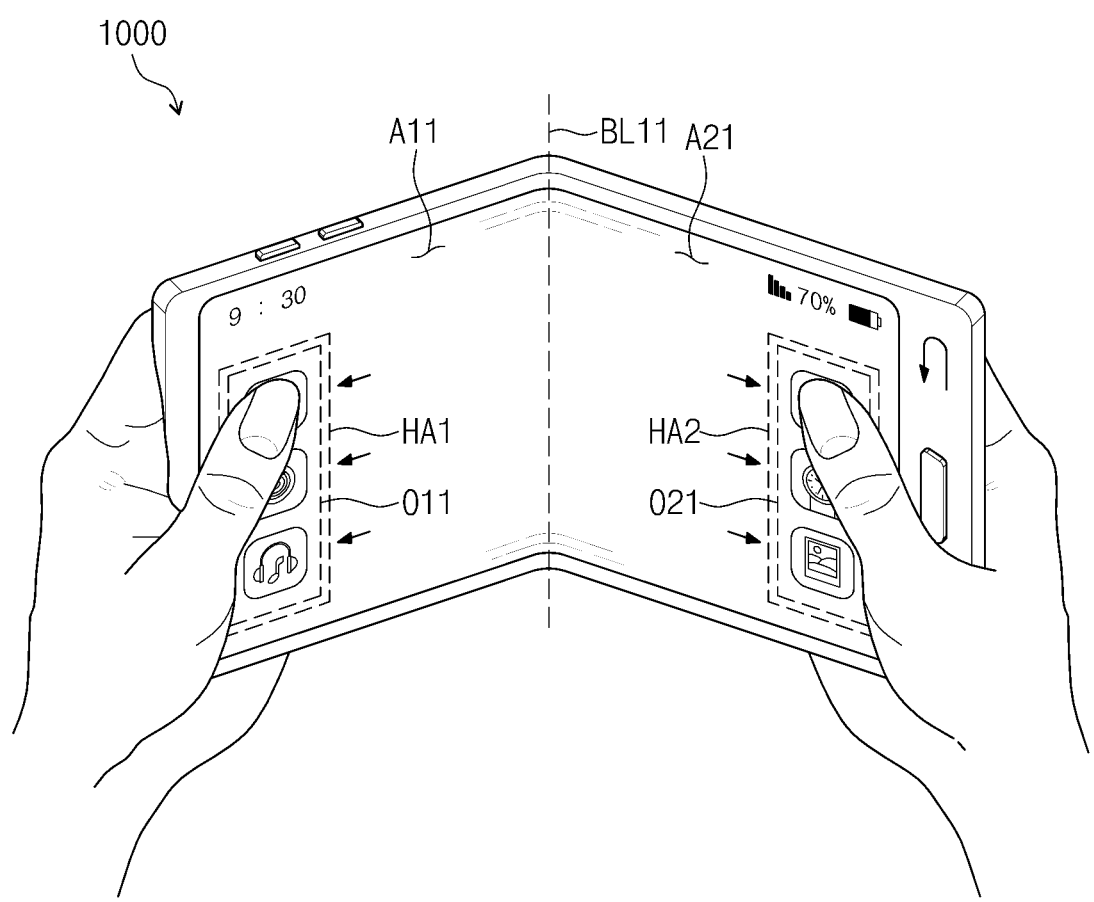
FIG. 3 is a view showing an operation providing a user interface corresponding to a deformation of a display apparatus according to another example embodiment of the present invention.

FIG. 3 is a view showing an operation providing a user interface corresponding to a deformation of a display apparatus 1000 according to another example embodiment of the present invention.

Referring to FIG. 3, when the user grips the display apparatus 1000, the display apparatus 1000 senses the grip of the user, generates the grip information, and detects the grip on the basis of the grip information. For instance, a first grip area HA1 and a second grip area HA2 are defined on the display apparatus 1000 on the basis of the detected grip information.

The first grip area HA1 corresponds to an area gripped by a left hand of the user and the second grip area HA2 corresponds to an area gripped by a right hand of the user. The first and second grip areas HA1 and HA2 are respectively located in the first and second areas A11 and A21.

In the present example embodiment, when the display apparatus 1000 is bent with respect to the first bending line BL11, the display apparatus 1000 moves the first object O11 to the first grip area HA1 and the second object O21 to the second grip area HA2.

As described above, because the user may move the objects, which are difficult to be selected by the touch operation, to the areas, which are easy to be touched and correspond to the areas gripped by the user, and easily select the objects, the convenience and usability of the display apparatus 1000 may be improved.

Figure 4A:
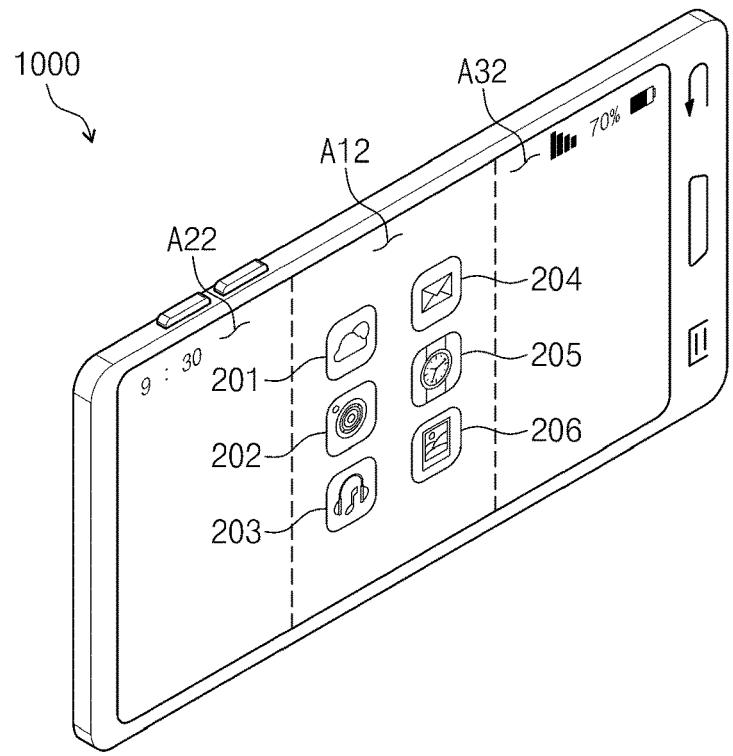
FIGS. 4A and 4B are views showing an operation providing a user interface corresponding to a deformation of a display apparatus according to another example embodiment of the present invention.
Figure 4B:
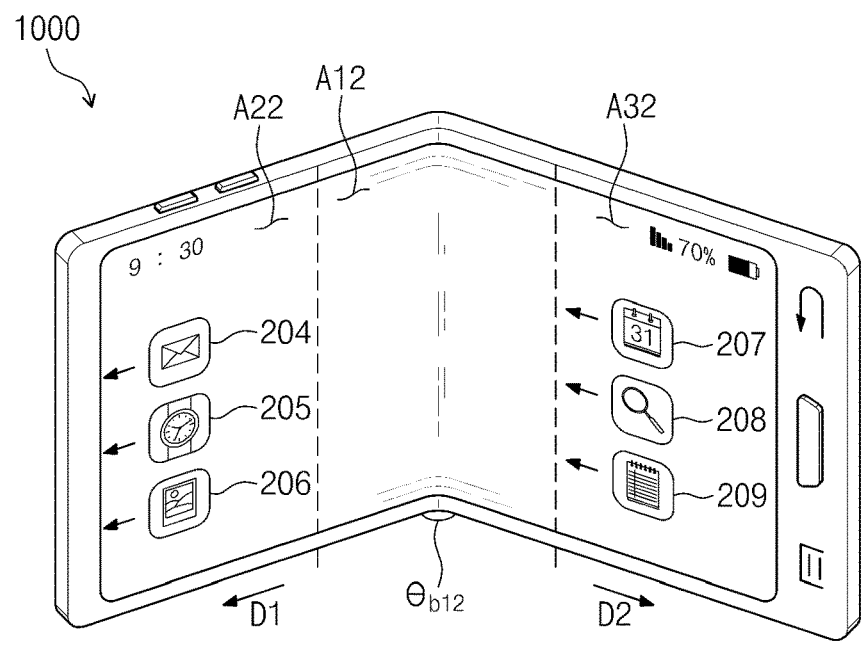

FIGS. 4A and 4B are views showing an operation providing a user interface corresponding to a deformation of a display apparatus 1000 according to another example embodiment of the present invention.

Referring to FIG. 4A, the display apparatus 1000 displays the weather, camera, music, mail, watch, and photograph icons 201 to 206 in a first area A12. As an example, the first area A12 is defined between a second area A22 defined in a left side of the display apparatus 1000 and a third area A32 defined in a right side of the display apparatus 1000.

Referring to FIG. 4B, when the display apparatus 1000 is bent, the display apparatus 1000 detects the bending thereof and scrolls the image displayed thereof and/or the objects.

In more detail, the weather, camera, and music icons 201 to 203 displayed through the first area A12 in the unbending state are scrolled to (or repositioned along) a first direction D1 of the second area A22 to be disappeared when the display apparatus 1000 is bent and not displayed. In addition, the mail, watch, and photograph icons 204 to 206 displayed through the first area A12 in the unbending state move to the first direction D1 when the display apparatus 1000 is bent, and then are displayed in the second area A22. A calendar icon 207, a search icon 208, and a memo icon 209, which are not displayed in the unbending state, move to a direction opposite to the second direction D2, and then are displayed in the third area A32.

The scroll operation according to the present example embodiment should not be limited to the icons. That is, when a photograph application is used, photographs may be scrolled to search the photographs.

The display apparatus 1000 may determine a scroll speed of the icons 201 to 209 on the basis of a bending angle $\theta_{b12}$. For instance, when the bending angle $\theta_{b12}$ is smaller than an angle (e.g., a predetermined angle), the scroll speed of each of the icons 201 to 209 is greater than the scroll speed of the icons 201 to 209 when the bending angle $\theta_{b12}$ is greater than the angle (e.g., the predetermined angle).

Figure 5A:
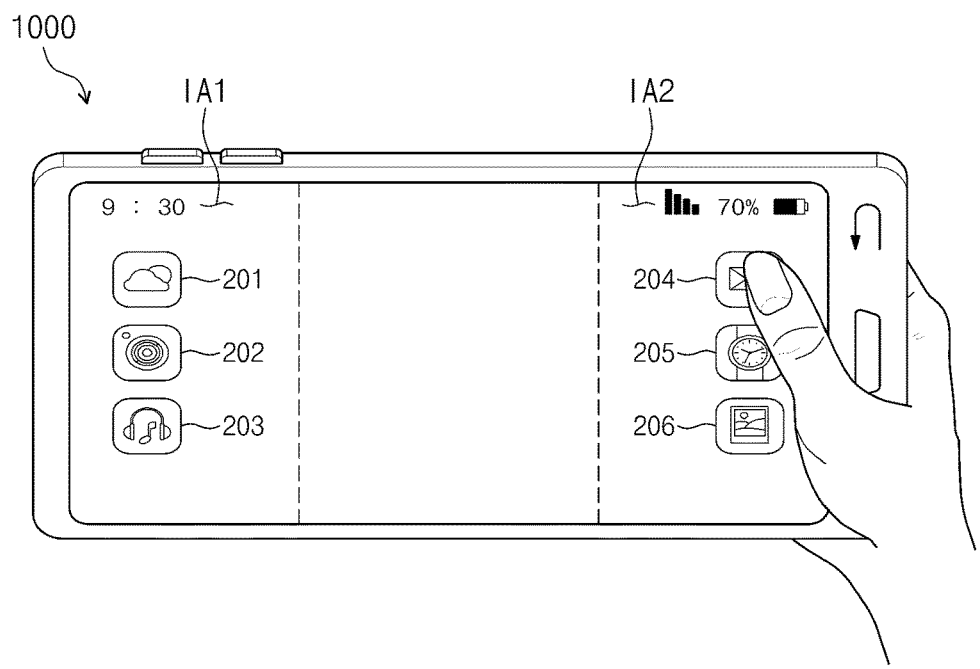
FIGS. 5A to 5C are views showing an operation providing a user interface corresponding to a deformation of a display apparatus according to another example embodiment of the present invention.
Figure 5B:
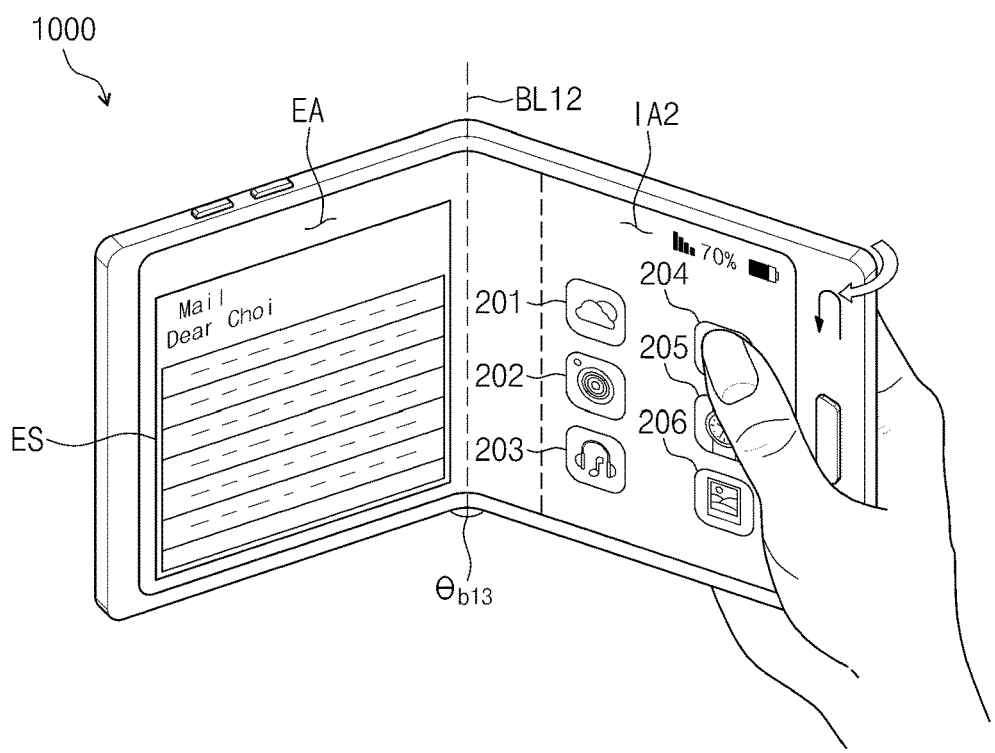
Figure 5C:
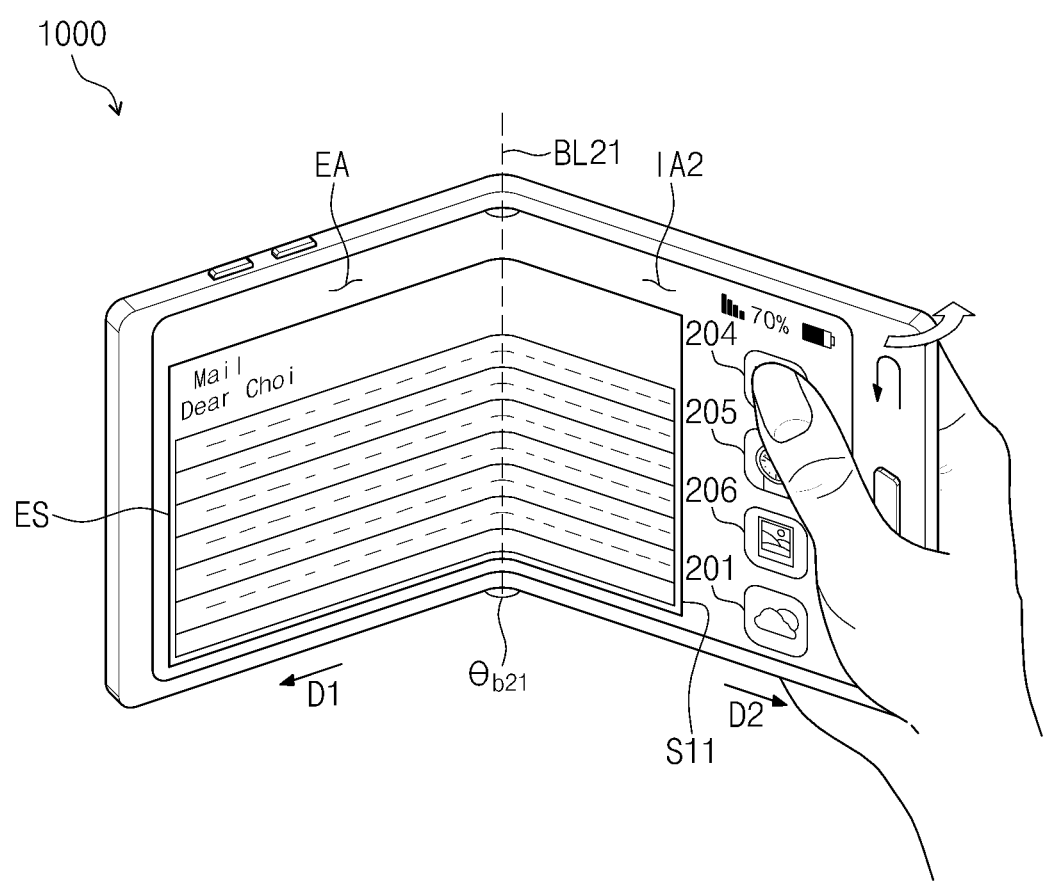

FIGS. 5A to 5C are views showing an operation providing a user interface corresponding to a deformation of a display apparatus 1000 according to another example embodiment of the present invention.

Referring to FIGS. 5A and 5B, the display apparatus 1000 displays the weather, camera, and music icons 201 to 203 in a first icon arrangement area IA1 and displays the mail, watch, and photograph icons 204 to 206 in a second icon arrangement area IA2.

Then, the display apparatus 1000 receives a first touch input generated when the user selects the main icon 204 and detects that the user selects the mail icon 204. When the user performs a first bending operation on the display apparatus 1000 while the user inputs the first touch input, the display apparatus 1000 detects the first bending and checks (or determines) whether an execution command of a main application corresponding to the main icon 204 is input or not on the basis of the first bending.

When it is checked (or determined) that the execution command of the mail application is input, the display apparatus 1000 generates a first control signal to execute the main application, and the mail application is executed by the first control signal.

As an example, the display apparatus 1000 checks (or determines) whether the execution command of the mail application is input on the basis of various information, such as a bending position, a bending region, a bending direction, a bending angle, a bending intensity, a bending speed, a number of times of bending, a time point of the bending, a maintain time of the bending, etc., of the first bending.

For instance, in the case that the bending maintain time of the first bending is within about 1 second and the display apparatus 1000 is unbent (hereinafter, referred to as a flicking), or a first bending angle $\theta_{b13}$ of the first bending is equal to or greater than a predetermined angle, the display apparatus 1000 determines that the execution command of the mail application is input and generates the first control signal.

In addition to the first bending angle $\theta_{b13}$, the display apparatus 1000 detects first and second movements of the first and second icon arrangement areas IA1 and IA2 and checks whether the execution command of the mail application is input on the basis of the first and second movements, thereby generating the first control signal.

For instance, in the case that the first icon arrangement area IA1 is fixed, the first movement is not detected, and the second movement is the movement of the second icon arrangement area IA2 to allow the first bending angle $\theta_{b13}$ to be small, the display apparatus 1000 determines that the execution command of the mail application is input and generates the first control signal. In the present example embodiment, the second movement corresponds to a movement that rotates the second icon arrangement area IA2 at an angle (e.g., a predetermined angle) in a counter-clockwise direction with respect to a first bending line BL12.

In addition, in the case that the second icon arrangement area IA2 is fixed, the second movement is not detected, and the first movement is the movement of the first icon arrangement area IA1 to allow the first bending angle $\theta_{b13}$ to be small, the display apparatus 1000 determines that the execution command of the mail application is input and generates the first control signal. In the present example embodiment, the first movement corresponds to a movement that rotates the first icon arrangement area IA1 at an angle (e.g., a predetermined angle) in a clockwise direction with respect to the first bending line BL12.

When the display apparatus 1000 is bent, the display apparatus 1000 detects the first bending line BL12 on the basis of the bending information and partitions an execution area EA distinct from the second icon arrangement area IA2. As an example, the execution area EA is placed at a left side with respect to the first bending line BL12 and the second icon arrangement area IA2 is placed at a right side with respect to the first bending line BL12.

As an example, the display apparatus 1000 may display an execution screen ES of the mail application in the execution area EA. As described above, because the user may decide the area, in which the execution of the desired application and the display area of the execution screen of the desired application are displayed, by the bending operation, the usability of the display apparatus 1000 may be improved.

In addition, when the execution area EA is overlapped with the first icon arrangement area IA1 (refer to FIG. 5A), the display apparatus 1000 may display the weather, camera, and music icons 201 to 203 displayed in the first icon arrangement area IA1 in the second icon arrangement area IA2 not overlapped with the execution area EA.

Referring to FIG. 5C, the display apparatus 1000 detects a selection input from the user and activates an execution screen ES of the mail application in response to the selection input. For instance, the selection input may be, but is not limited to, a second touch input generated by the user who selects the mail icon 204.

In addition, the display apparatus 1000 receives a bending activation input from the user and controls a size of the execution screen ES of the mail application in response to the bending activation input. For instance, the bending activation input corresponds to an operation that maintains the touch on the mail icon 204.

When the user performs a second bending operation on the display apparatus 1000 while maintaining the touch on the mail icon 204 and inputting the bending activation input, the display apparatus 1000 detects the second bending and checks whether an execution command used to control the size of the execution screen ES of the mail application on the second bending. In case of the second bending, the display apparatus 1000 is bent with respect to a second bending line BL21.

When it is checked (or determined) whether or not the execution command for the control of the size of the execution screen ES of the mail application is input, the display apparatus 1000 generates a second control signal to control the size of the execution screen ES of the mail application and controls the size of the execution screen ES of the mail application in response to the second control signal. The display apparatus 1000 may check whether the bending is to control the execution screen ES of the mail application or not on the basis of the bending activation input. Accordingly, the user may selectively provide the display apparatus 1000 with the bending for the control of the execution screen ES of the mail application and the bending not related to control the execution screen ES of the mail application.

As an example, when a second bending angle $\theta_{b21}$ between the second icon arrangement area IA2 and the execution area EA increases, the display apparatus 1000 increases the size of the execution screen ES of the mail application.

In detail, the second bending angle $\theta_{b21}$ is greater than a bending angle at a time point at which the bending activation input is input, the display apparatus 1000 increases the size of the execution screen ES of the mail application.

The display apparatus 1000 may expand the execution screen ES of the mail application to allow the execution screen ES of the mail application is overlapped with the second icon arrangement area IA2. In this case, the display apparatus 1000 rearranges the icons arranged in the second icon arrangement area IA2 or does not display a portion of the icons. For instance, the display apparatus 1000 does not display the camera and music icons 202 and 203 displayed in the first icon arrangement area IA1 before the second bending operation is performed on the display apparatus 1000 and rearranges the mail, watch, photograph, and weather icons 204, 205, 206, and 201 in an area of the second icon arrangement area IA2, which is not overlapped with the expanded execution screen ES of the mail application.

In addition, when the second bending angle $\theta_{b21}$ between the second icon arrangement area IA2 and the execution area EA decreases, the display apparatus 1000 decreases the size of the execution screen ES of the mail application. For example, the second bending angle $\theta_{b21}$ is smaller than the bending angle at the time point at which the bending activation input is input, the display apparatus 1000 decreases the size of the execution screen ES of the mail application.

In addition to the second bending angle $\theta_{b21}$, the display apparatus 1000 senses third and fourth movements of the second icon arrangement area IA2 and the execution area EA and decreases or expands the execution screen ES of the mail application on the basis of the third and fourth movements.

For instance, in the case that the execution area EA is fixed, the fourth movement is not detected, and the third movement is the movement of the second icon arrangement area IA2 to allow the second bending angle $\theta_{b21}$ to be large, the display apparatus 1000 expands the execution screen ES of the mail application. In the present example embodiment, the third movement corresponds to a movement that rotates the second icon arrangement area IA2 at a predetermined angle in a counter-clockwise direction with respect to a second bending line BL21.

For example, the display apparatus 1000 expands the execution screen ES of the mail application along a direction corresponding to the third movement. For example, the execution screen ES of the mail application may be expanded in the second direction D2 by moving a first side S11 adjacent to the second icon arrangement area IA2 among sides of the execution screen ES of the mail application to the second direction D2.

As described above, because the size of the execution screen of the applications is increased or decreased by the bending operation, the convenience and usability of the display apparatus 1000 may be improved.

Figure 6A:
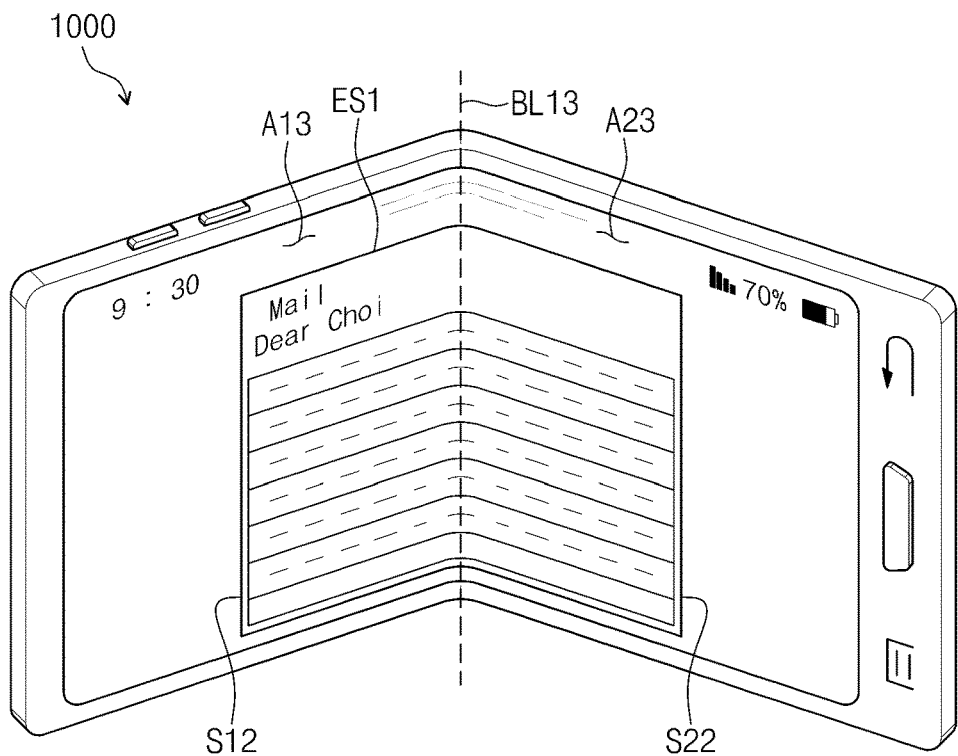
FIGS. 6A and 6B are views showing an operation providing a user interface corresponding to a deformation of a display apparatus according to another example embodiment of the present invention.
Figure 6B:
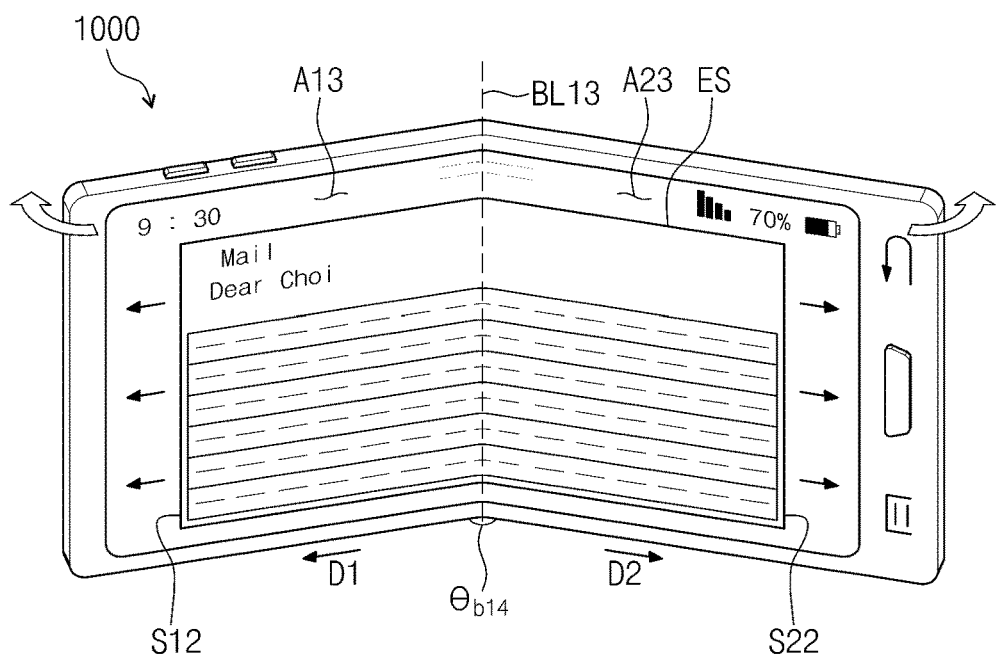

FIGS. 6A and 6B are views showing an operation providing a user interface corresponding to a deformation of a display apparatus 1000 according to another example embodiment of the present invention.

In FIGS. 6A and 6B, the display apparatus 1000 are operated in the same way as that of the display apparatus 1000 shown in FIG. 5C except for the expansion of the execution screen ES of the mail application.

Referring to FIGS. 6A and 6B, the display apparatus 1000 is bent with respect to a first bending line BL13 and a first area A13 and a second area A23 are defined at both sides of the first bending line BL13 on the display apparatus 1000.

As shown in FIG. 6A, the execution screen ES of the mail application is displayed over the first and second areas A13 and A23.

As shown in FIG. 6B, when the display apparatus 1000 is bent, the display apparatus 1000 senses fifth and sixth movements of the first and second areas A13 and A23 and expands or decreases the execution screen ES of the mail application on the basis of the fifth and sixth movements.

For instance, when the fifth and sixth movements are the movements of the first and second areas A13 and A23 to allow a bending angle $\theta_{b14}$ between the first and second areas A13 and A23 to be large, the display apparatus 1000 expands the execution screen ES of the mail application to both sides.

In the present example embodiment, the fifth and sixth movements respectively correspond to movements that rotate the first and second areas A13 and A23 at a predetermined angle in clockwise and counter-clockwise directions with respect to the first bending line BL13.

The display apparatus 1000 expands the execution screen ES of the mail application along directions respectively corresponding to the fifth and sixth movements. For example, among sides of the execution screen ES of the mail application, a first side S11 provided in the first area A13 moves to the first direction D1 and a second side S21 provided in the second area A23 moves to the second direction D2. Thus, the execution screen ES of the mail application may be expanded.

Figure 7A:
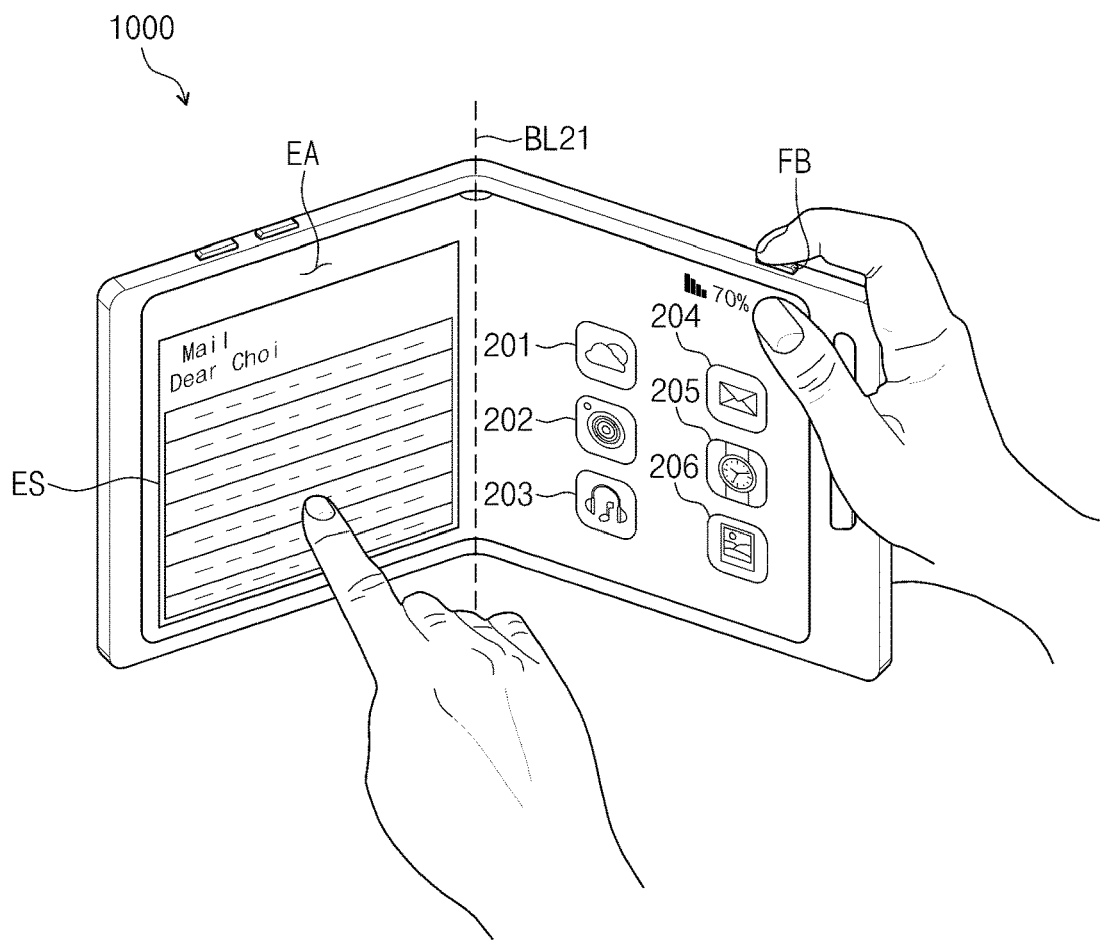
FIGS. 7A and 7B are views showing an operation providing a user interface corresponding to a deformation of a display apparatus according to another example embodiment of the present invention.
Figure 7B:
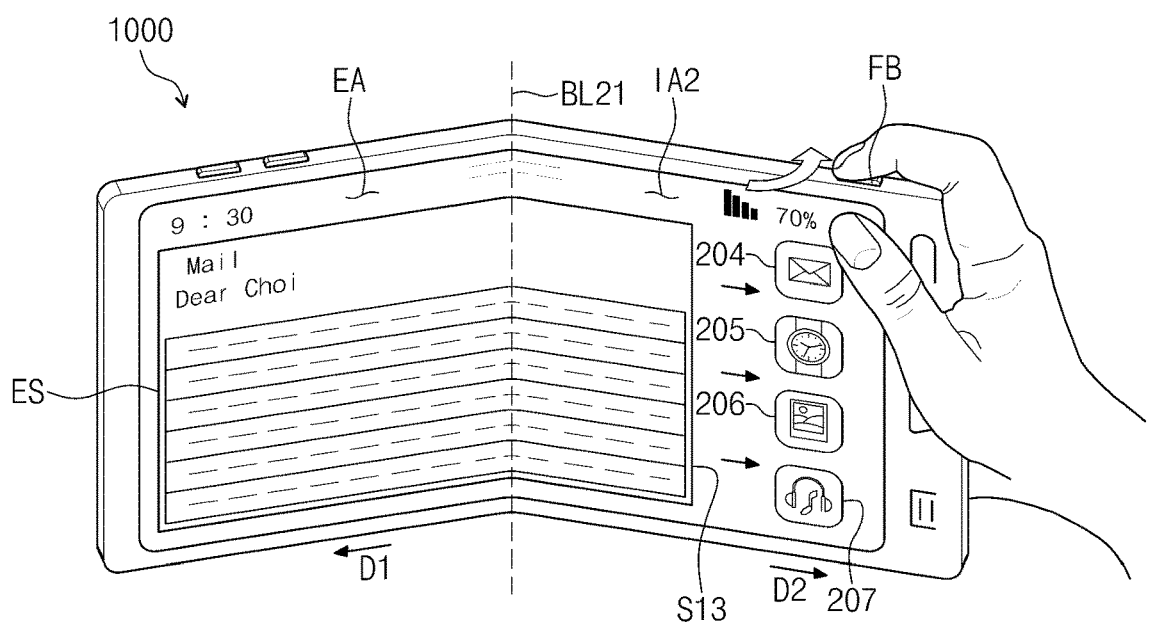

FIGS. 7A and 7B are views showing an operation providing a user interface corresponding to a deformation of a display apparatus 1000 according to another example embodiment of the present invention.

In FIGS. 7A and 7B, the display apparatus 1000 are operated in the same way as that of the display apparatus 1000 shown in FIG. 5C except for the expansion of the execution screen ES of the mail application.

As an example, the selection input may be the operation of the user who touches the execution screen ES of the mail application and the bending activation input may corresponding to the operation of the user who pushes a function button FB provided on the display apparatus 1000.

In the present example embodiment, the function button FB is protruded from a housing of the display apparatus 1000.

When the user touches the execution screen ES of the mail application to activate the execution screen ES of the mail application and performs the second bending operation on the display apparatus 1000 while pushing the function button FB, the display apparatus 1000 detects the second bending and checks whether an execution command to control the size of the execution screen ES of the mail application is input on the basis of the second bending.

When it is checked that the execution command to control the size of the execution screen ES of the mail application is input, the display apparatus 1000 generates a second control signal indicating to control the size of the execution screen ES of the mail application and controls the size of the execution screen ES of the mail application in response to the second control signal.

For example, the execution screen ES of the mail application may be expanded in the second direction D2 by moving a first side S13 adjacent to the second icon arrangement area IA2 among sides of the execution screen ES of the mail application to the second direction D2.

Figure 8A:
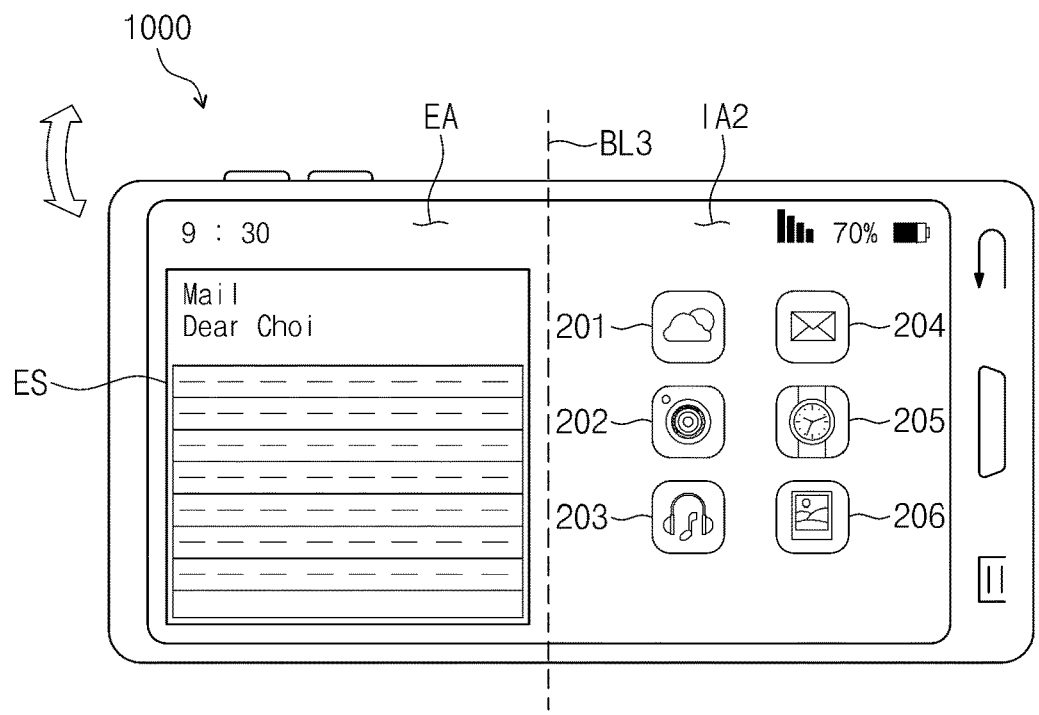
FIGS. 8A and 8B are views showing an operation providing a user interface corresponding to a deformation of a display apparatus according to another example embodiment of the present invention.
Figure 8B:
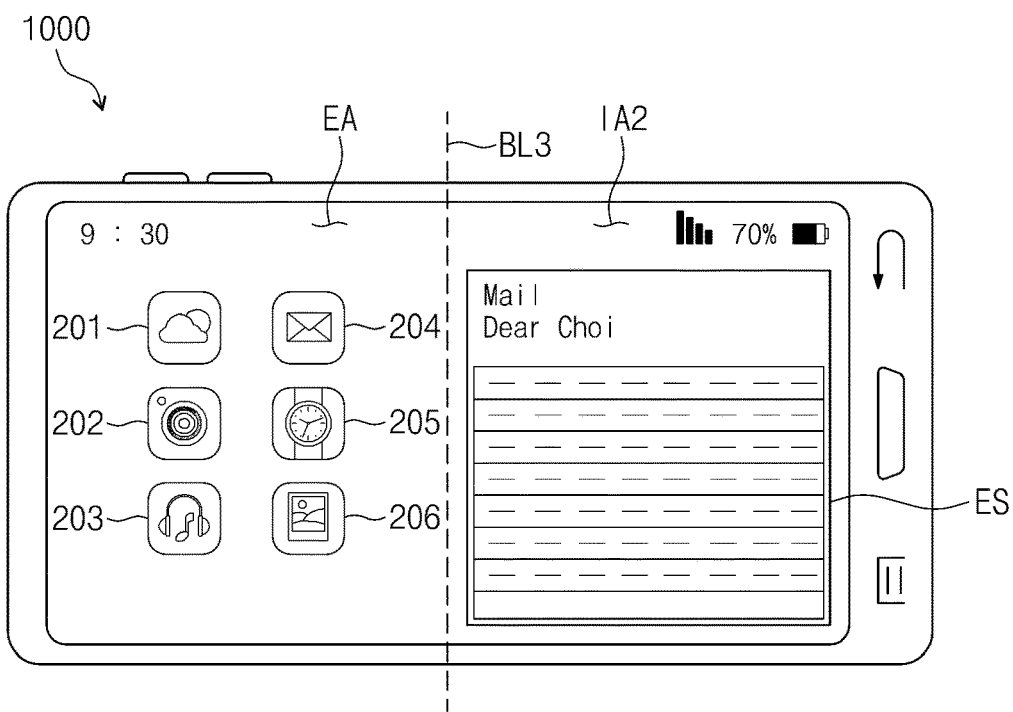

FIGS. 8A and 8B are views showing an operation providing a user interface corresponding to a deformation of a display apparatus 1000 according to another example embodiment of the present invention.

Referring to FIG. 8A, the display apparatus 1000 displays the execution screen ES of the mail application in the execution area EA and displays the icons 201 to 206 in the second icon arrangement area IA2.

When the user performs a third bending operation on the display apparatus 1000, the display apparatus 1000 detects the third bending and checks (or determines) whether or not a command indicating to move and display an object displayed in the execution area EA, i.e., the execution screen ES of the mail application, to the second icon arrangement area IA2 is input on the basis of the third bending.

Referring to FIG. 8B, when it is checked (or determined) that the command indicating to move and display the execution screen ES of the mail application to and in the second icon arrangement area IA2 is input, the display apparatus 1000 generates a third control signal to move the execution screen ES of the mail application to the second icon arrangement area IA2 and to display the execution screen ES of the mail application in the second icon arrangement area IA2 and displays the execution screen ES of the mail application in the second icon arrangement area IA2 in response to the third control signal.

In addition, the display apparatus 1000 may move the icons 201 to 206 arranged in the second icon arrangement area IA2 to the execution area EA and display the icons 201 to 206 in the execution area EA, and thus the icons 201 to 206 are not overlapped with the execution screen ES of the mail application.

As an example, in the case that the third bending corresponds to the flicking operation allowing the third bending to decrease the bending angle or the bending angle of the third bending is equal to or greater than an angle (e.g., a predetermined angle) after the execution screen ES of the mail application is activated, the display apparatus 1000 determines that the command indicating to move and display the execution screen ES of the mail application to and in the second icon arrangement area IA2 is input. In addition, a third bending line BL3 caused by the third bending is defined along a boundary between the execution area EA and the second icon arrangement area IA2, the display apparatus 1000 determines that the command indicating to move and display the execution screen ES of the mail application to and in the second icon arrangement area IA2 is input.

In addition, the display apparatus 1000 detects seventh and eighth movements of the second icon arrangement area IA2 and the execution area EA and determines that the command indicating to move and display the execution screen ES of the mail application to and in the second icon arrangement area IA2 is input on the basis of the seventh and eighth movements.

For instance, in the case that the second icon arrangement area IA2 is fixed, the seventh movement is not detected, and the eighth movement is the movement of the execution area EA to allow the bending angle to be small, the display apparatus 1000 determines that the command indicating to move and display the execution screen ES of the mail application to and in the second icon arrangement area IA2 is input. In the present example embodiment, the eighth movement corresponds to a movement that rotates the execution area EA at an angle (e.g., a predetermined angle) in a counter-clockwise direction with respect to the third bending line BL3.

As described above, because the execution screen of the applications moves by the bending with respect to the bending line, the convenience and usability of the display apparatus 1000 may be improved.

Figure 9A:
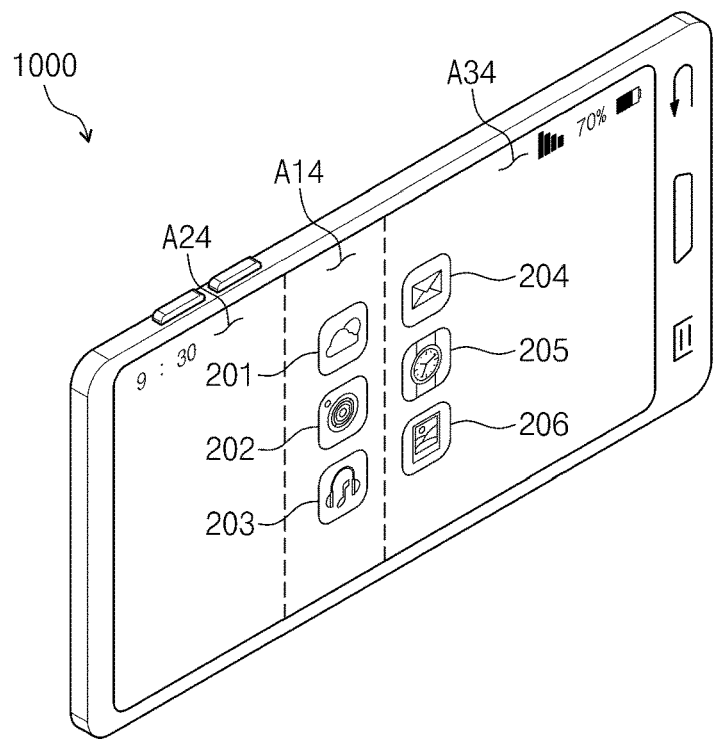
FIGS. 9A to 9C are views showing an operation providing a user interface corresponding to a deformation of a display apparatus according to another example embodiment of the present invention.
Figure 9B:
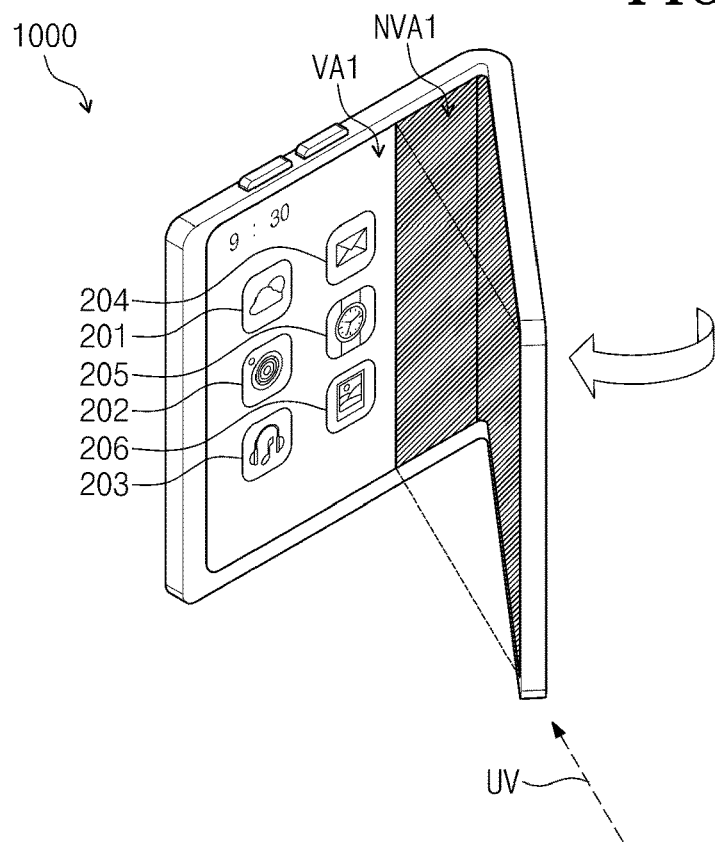
Figure 9C:
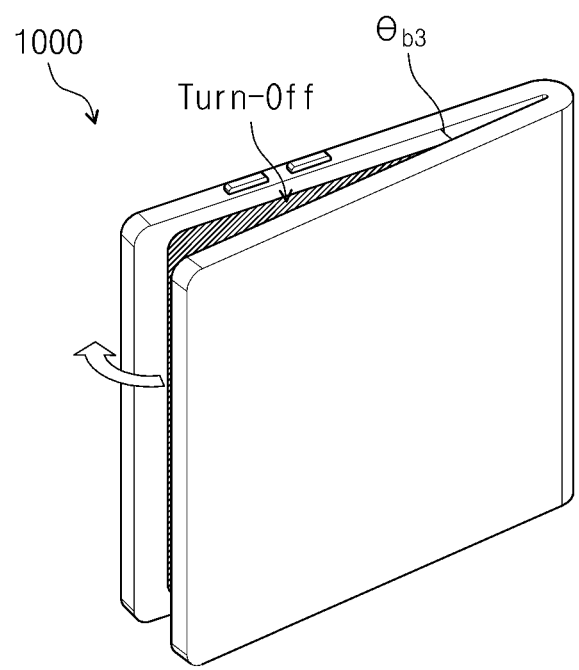

FIGS. 9A and 9B are views showing an operation providing a user interface corresponding to a deformation of a display apparatus 1000 according to another example embodiment of the present invention.

Referring to FIG. 9A, the display apparatus 1000 displays the weather, camera, and music icons 201 to 203 in a first area A14 and displays the mail, watch, and photograph icons 204 to 206 in the third area A34.

Referring to FIG. 9B, when the display apparatus 1000 is bent, the display apparatus 1000 detects the bending. The display apparatus 1000 defines a visible area VA1 and a non-visible area are NVA1 therein on the basis of the bending.

The visible area VA1 is perceived by the user and the non-visible area NVA1 is not perceived by the user. The visible area VA1 and the non-visible area NVA1 may be changed depending on the user's gaze UV and the bending.

For example, when a bending angle is equal to or greater than a predetermined angle after the display apparatus 1000 is bent by the user, only a second area A24 is perceived by the user and the first and third areas A14 and A34 shown in FIG. 9A are not perceived by the user. Here, the second area A24 perceived by the user is referred to as the visible area VA1 and the first and third areas A14 and A34 not perceived by the user are referred to as the non-visible area NVA1.

To reduce power consumption, the display apparatus 1000 may drive the non-visible area NVA1 not perceived by the user in a power saving mode. As an example, the display apparatus 1000 displays an image with a black grayscale in the non-visible area NVA1 during the power saving mode, and thus the power consumption in the non-visible area NVA1 is reduced. As another way, the display apparatus 1000 may block a power supplied to the non-visible area NVA1 and/or elements of the display apparatus 1000, which drive the non-visible area NVA1, during the power saving mode. In addition, the display apparatus 1000 may lower the grayscale of the image displayed in the non-visible area NVA1 during the power saving mode.

The display apparatus 1000 may rearrange the icons 201 to 206 displayed in the first and third areas A14 and A34 to correspond to the visible area VA1 after the bending of the display apparatus 1000 and display the icons 201 to 206 in the visible area VA1.

Further, the display apparatus 1000 may process objects displayed before the bending of the display apparatus 1000 to correspond to the visible area VA1 and display the objects in the visible area VA1. For instance, the display apparatus 1000 may control the size of the screen of the application displayed before the bending of the display apparatus 1000 to correspond to the size of the visible area VA1 and display the screen of the application in the visible area VA1.

As described above, the visible area VA1 and the non-visible area NVA1 may be changed depending on the user's gaze UV in accordance with a position of the user.

The display apparatus 1000 senses the user's gaze UV, generates gaze information to trace variations of the visible and non-visible areas VA1 and NVA1, detects the user's gaze UV on the basis of the gaze information, and defines the visible area VA1 and the non-visible area NVA1 therein on the basis of the bending information and the user's gaze UV.

The display apparatus 1000 moves the icons 201 to 206 displayed in the first and third areas A14 and A34 before the bending of the display apparatus 1000 to the second area A24 corresponding to the visible area VA1 after the bending of the display apparatus 1000 to display the icons 201 to 206 in the second area A24 corresponding to the visible area VA1 after the bending of the display apparatus 1000. In addition, the display apparatus 1000 decreases the size of the image displayed over the first, second, and third areas A14, A24, and A34 before the bending of the display apparatus 1000 to correspond to the visible area VA1 after the bending of the display apparatus 1000 and displays the image in the visible area VA1.

When the display apparatus 1000 is in the folded state and a bending angle $\theta_{b3}$ is smaller than a predetermined angle while the display apparatus 1000 is being folded, the display apparatus 1000 turns off the display panel 110 (refer to FIG. 1) as shown in FIG. 9B.

The display apparatus 1000 determines that the display apparatus 1000 is being folded when the bending angle is smaller than the angle (e.g., the predetermined angle) and becomes continuously smaller.

Figure 10A:
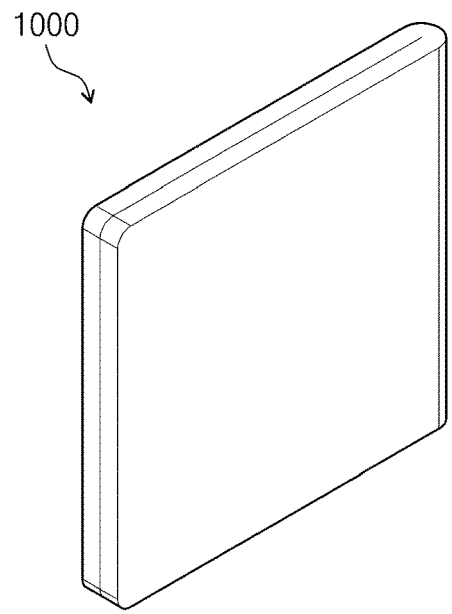
FIGS. 10A and 10B are views showing an operation providing a user interface corresponding to a deformation of a display apparatus according to another example embodiment of the present invention.
Figure 10B:
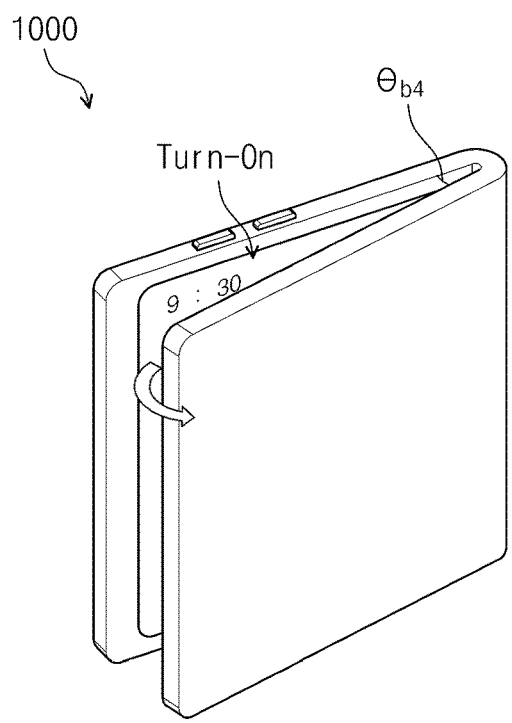

FIGS. 10A and 10B are views showing an operation providing a user interface corresponding to a deformation of a display apparatus 1000 according to another example embodiment of the present invention.

Referring to FIG. 10A, when the display apparatus 1000 is in the folded state, the display apparatus 1000 detects the folded state to determine that the display apparatus 1000 is in the folded state. The display panel 110 (refer to FIG. 1) of the display apparatus 1000 is turned off in the folded state.

Then, when the display apparatus 1000 in the folded state is unfolded, the display apparatus 1000 determines that the display apparatus 1000 is being unfolded on the basis of the bending of the display apparatus 1000. For instance, when a bending angle $\theta_{b4}$ becomes continuously larger in the folded state, the display apparatus 1000 determines that the display apparatus 1000 is being unfolded.

The display apparatus 1000 turns on the display panel 110 when the bending angle $\theta_{b4}$ is larger than a turn-on angle (e.g., a predetermined turn-on angle).

As an example, the turn-on angle is smaller than the turn-off angle. Accordingly, in the case that the user folds the display apparatus 1000 not to use the display apparatus 1000, the display panel 110 is turned off in early stages, and thus the power consumption is reduced. In the case that the user unfolds the display apparatus 1000 to use the display apparatus 1000, the display panel 110 is turned on in early stages, and thus the user sees the image instantly.

Figure 11A:
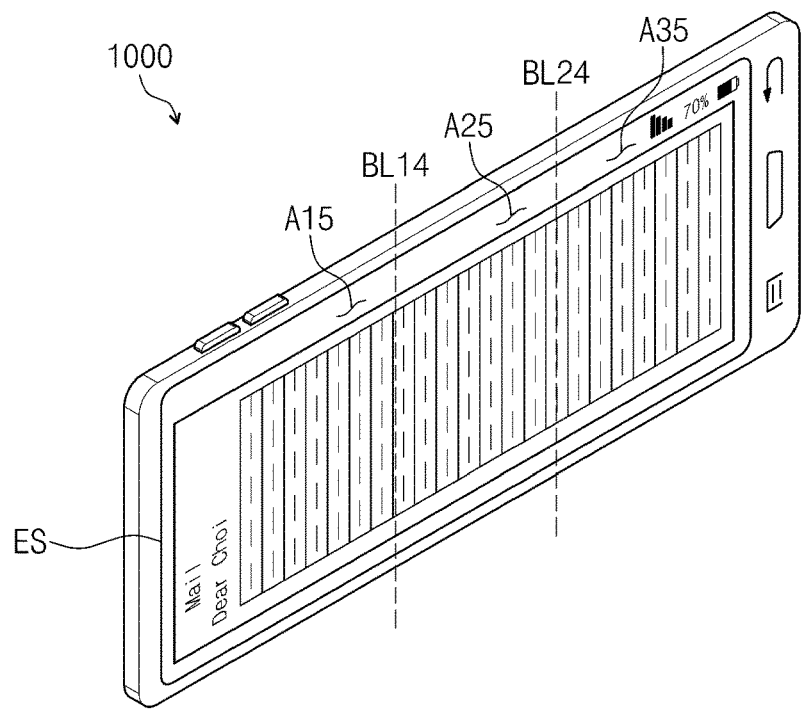
FIGS. 11A to 11C are views showing an operation providing a user interface corresponding to a deformation of a display apparatus according to another example embodiment of the present invention.
Figure 11B:
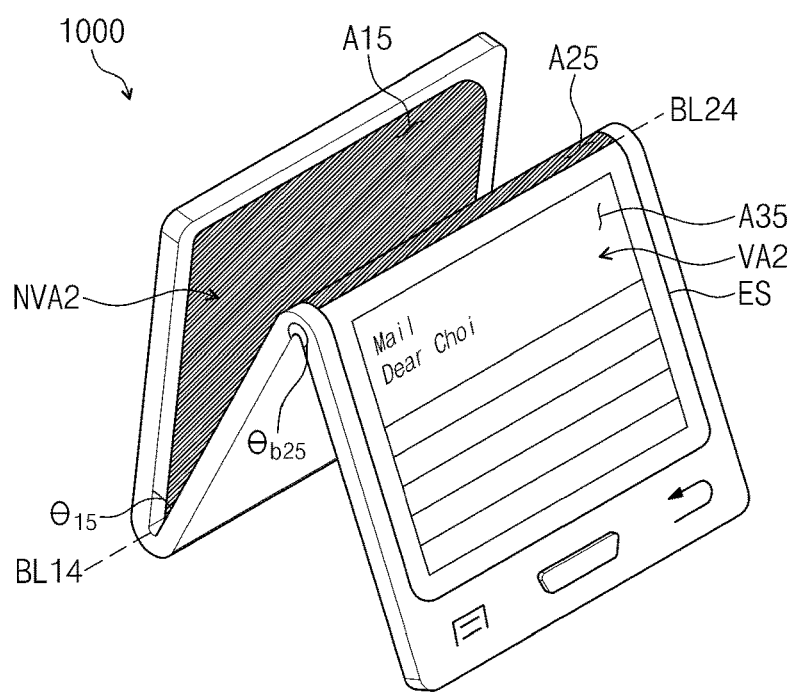
Figure 11C:
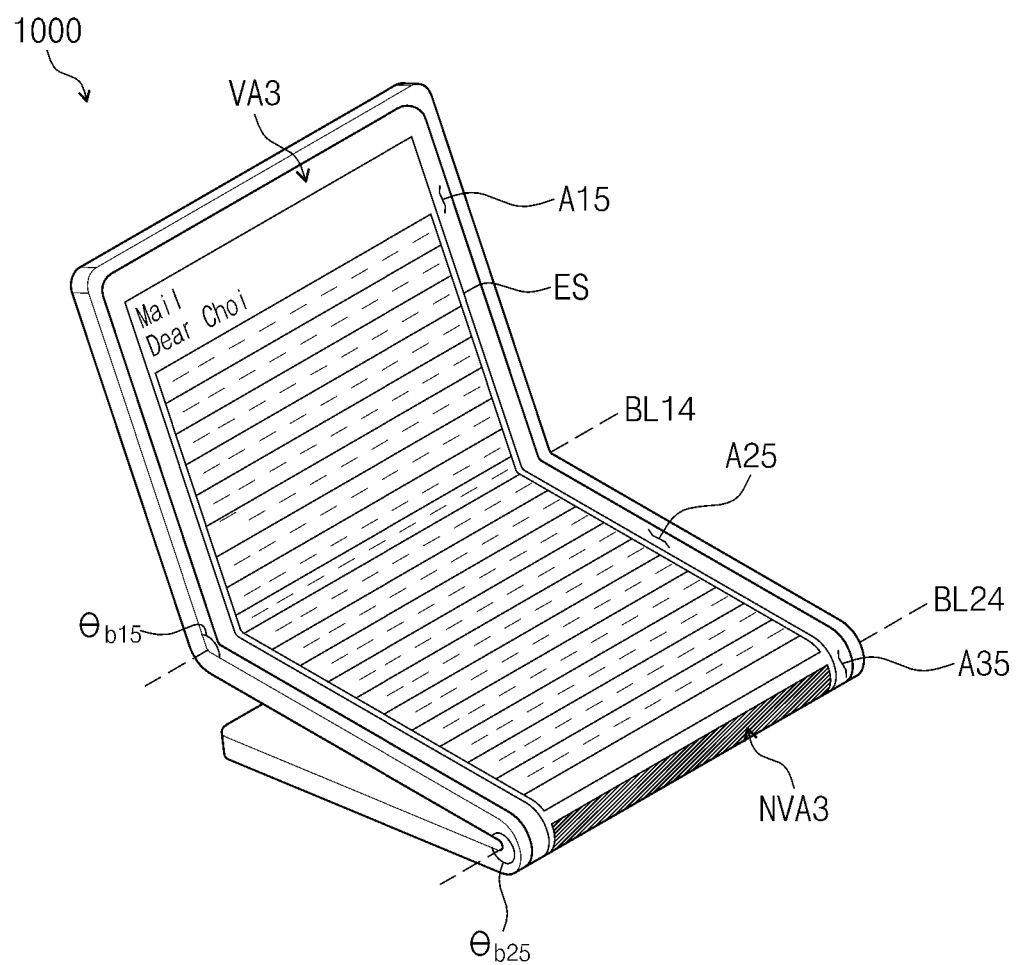

FIGS. 11A to 11C are views showing an operation providing a user interface corresponding to a deformation of a display apparatus 1000 according to another example embodiment of the present invention.

Referring to FIG. 11A, the display apparatus 1000 displays the execution screen ES of the mail application through first, second, and third areas A15, A25, and A35 while being unfolded. As an example, the first, second, and third areas A15, A25, and A35 are sequentially defined along a longitudinal direction of the display apparatus 1000.

In the present example embodiment, a first bending line BL14 is defined between the first and second areas A15 and A25 and a second bending line BL24 is defined between the second and third areas A25 and A35. When the display apparatus 1000 is bent, the display apparatus 1000 may be folded two times along the first and second bending lines BL14 and BL24.

Referring to FIG. 11B, a first bending angle $\theta_{b15}$ between the first and second areas A15 and A25 may be smaller than a second bending angle $\theta_{b25}$ between the second and third areas A25 and A35. In this case, the first and second areas A15 and A25 face each other and are overlapped with each other. Therefore, the first and second areas A15 and A25 are not exposed to the outside of the display apparatus 1000 and the third area A35 is exposed to the outside of the display apparatus 1000. Hereinafter, the above-mentioned folding shape in which the display apparatus 1000 is folded two times in an S-shaped formation is referred to as an S-shaped two-folding.

When the display apparatus 1000 is folded in the S-shaped two-folding, the display apparatus 1000 may define a visible area VA2 and a non-visible area NVA2 on the basis of the first and second bending angles $\theta_{b15}$ and $\theta_{b25}$. Since the first and second areas A15 and A25 are not perceived by the user and the third area A35 is perceived by the user, the display apparatus 1000 includes the first and second areas A15 and A25 into the non-visible area NVA2 and the third area A35 into the visible area VA2.

As a result, the non-visible area NVA2 is driven in the power saving mode and the size of the execution screen ES of the mail application executed before the bending of the display apparatus 1000 is controlled to correspond to the visible area VA2 to be displayed in the visible area VA2.

Referring to FIG. 11C, when the first and second bending angles $\theta_{b15}$ and $\theta_{b25}$ are changed, the display apparatus 1000 may display the execution screen ES of the mail application after moving the execution screen ES of the mail application. In more detail, in the case that the display apparatus 1000 is folded in the S-shaped two-folding such that the first bending angle $\theta_{b15}$ is greater than the second bending angle $\theta_{b25}$, the third area A35 is not perceived by the user and the first and second areas A15 and A25 are perceived by the user. Thus, the display apparatus 1000 includes the third area A35 into the non-visible area NVA3 and the first and second areas A15 and A25 into the visible area VA3.

As a result, the non-visible area NVA3 is driven in the power saving mode and the size of the execution screen ES of the mail application executed in the visible area VA2 before the bending of the display apparatus 1000 is controlled to correspond to the visible area VA3 to be displayed in the visible area VA3.

Figure 12A:
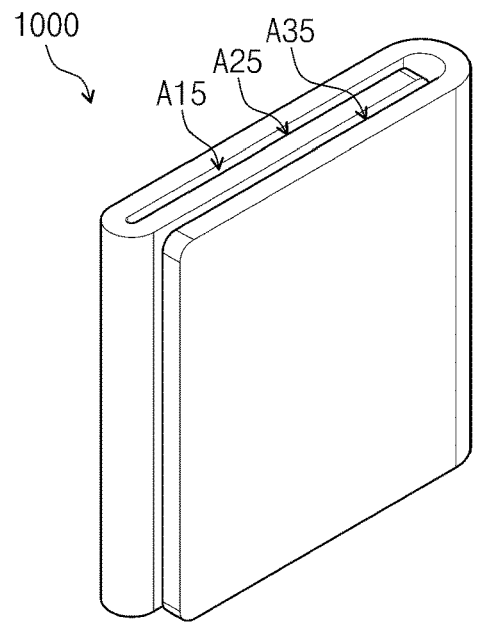
FIGS. 12A and 12B are views showing an operation providing a user interface corresponding to a deformation of a display apparatus according to another example embodiment of the present invention.
Figure 12B:
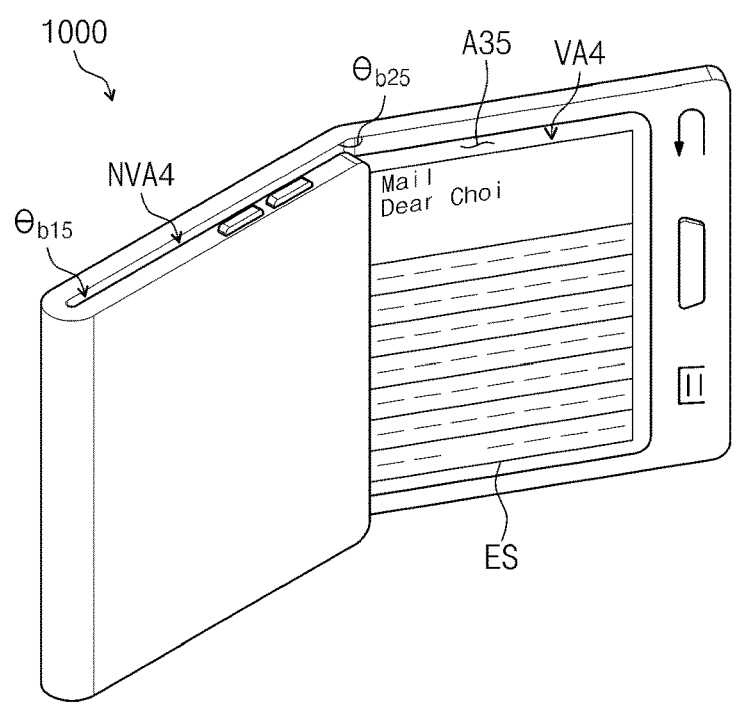

FIGS. 12A and 12B are views showing an operation providing a user interface corresponding to a deformation of a display apparatus 1000 according to another example embodiment of the present invention.

The display apparatus 1000 shown in FIGS. 12A and 12B are operated in the same way as the display apparatus 1000 shown in FIGS. 11A to 11C except for the bending shape of the display apparatus, and thud different features of the display apparatus 1000 shown in FIGS. 12A and 12B from those of the display apparatus 1000 shown in FIGS. 11A to 11C will be mainly described.

As shown in FIGS. 12A and 12B, the display apparatus 1000 may be folded in an E-shaped two-folding. When the display apparatus 1000 is folded in the E-shaped two-folding, the display apparatus 1000 is folded to allow the first, second, and third areas A15, A25, and A35 to be sequentially stacked.

When the display apparatus 1000 is folded in the E-shaped two-folding, the display apparatus 1000 detects the E-shaped two-folding to determine that the display apparatus 1000 is in the E-shaped two-folding. The display panel (refer to FIG. 1) of the display apparatus 1000 is turned off in the E-shaped two-folding.

When the display apparatus in the E-shaped two-folding is unfolded, the display apparatus 1000 determines one of the first, second, and third areas A15, A25, and A35 as a visible area VA4 and displays the objects in the visible area VA4 on the basis of the first and second bending angles $\theta_{b15}$ and $\theta_{b25}$. As an example, since the second bending angle $\theta_{b25}$ is greater than the first bending angle $\theta_{b15}$, the display apparatus 1000 includes the third area A35 into the visible area VA4 and displays the execution screen ES of the mail application through the third area A35.

Although the example embodiments of the present invention have been described, it is understood that the present invention should not be limited to these example embodiments but various changes and modifications can be made by one ordinary skilled in the art within the spirit and scope of the present invention as hereinafter claimed in the following claims, and their equivalents.

What is claimed is:

1. A display apparatus comprising:
    a display panel;
    a first sensor configured to sense a bending of the display panel;
    a second sensor configured to sense a gaze of a user; and
    a controller configured to:
        control the display panel, detect the bending using the first sensor, and detect the user's gaze using the second sensor;
        divide the display panel into a visible area perceived by a user and a non-visible area not perceived by the user due to the bending, which are defined in the display panel, according to the bending of the display panel and the user's gaze; and
        drive the non-visible area in a power saving mode,
    wherein an area of the non-visible area is changed according to the bending of the display panel and the user's gaze.

2. The display apparatus of claim 1, wherein the controller is configured to control a size of an object so as to correspond to the visible area displayed in the display panel before the bending of the display panel and after the bending of the display panel, and is configured to move and display the object in the visible area according to the bending of the display panel.

3. The display apparatus of claim 2, wherein the controller is configured to display an image having a black grayscale level at the non-visible area in the power saving mode.

4. The display apparatus of claim 1, wherein the controller is configured to determine that the display panel is in a folded state according to the bending and to turn off the display panel when a bending angle of the bending of the display panel is smaller than a predetermined turn-off angle while the display panel is being folded.

5. The display apparatus of claim 4, wherein the controller is configured to determine that the display panel is in an unfolded state and to turn on the display panel when the bending angle is greater than a predetermined turn-on angle while the display panel is in unfolded state, and the turn-on angle is smaller than the turn-off angle.

6. The display apparatus of claim 2, wherein the display panel is folded two times at first and second bending angles when the display panel is bent, and the controller is configured to divide the visible area and the non-visible area according to the first and second bending angles.

7. The display apparatus of claim 6, wherein the display panel is bent along a first bending line and a second bending line when the display panel is in the first bending,
    the controller is configured to define first, second, and third areas with respect to the first and second bending lines,
    at least one area of the first, second, and third areas is in the non-visible area,
    remaining areas of the first, second, and third areas are in the visible area,
    the first bending line is defined between the first and second areas, and
    the second bending line is defined between the second and third areas.

8. The display apparatus of claim 7, wherein, when the first bending angle is smaller than the second bending angle, the first and second areas are included in the non-visible area by the controller and the third area is included in the visible area by the controller.

9. The display apparatus of claim 8, wherein, when the second bending angle is smaller than the first bending angle, the first and second areas are included in the non-visible area by the controller and the third area is included in the visible area by the controller.

10. A display apparatus comprising:
    a display panel configured to display an image and comprising a first area, a second area extending from the first area, and a third area extending from the second area, wherein a first bending line is defined between the first area and the second area and a second bending line is defined between the second area and the third area;

a sensor configured to sense that the display panel is bent based on at least one of the first bending line and the second bending line; and a controller configured to control the display panel and the sensor;

wherein a first mode in which a first bending angle formed by the first area and the second area with respect to the first bending line is greater than or equal to a first reference angle value and a second mode in which the first bending angle is less than the first reference angle value are defined, wherein the controller is configured to control that power consumed by each of the first area and the second area in the second mode is lower than power consumed by each of the first area and the second area in the first mode when switching from the first mode to the second mode based on the bending of the display panel, wherein a third mode in which the first bending angle formed by the first area and the second area with respect to the first bending line is greater than or equal to a second reference angle value and a fourth mode in which the first bending angle is less than the second reference angle value are defined, wherein the controller is configured to control that power consumed by each of the first area and the second area in the third mode is higher than power consumed by each of the first area and the second area in the fourth mode when switching from the fourth mode to the third mode based on the bending of the display panel, and wherein the second reference angle value is smaller than the first reference angle value.

11. The display apparatus of claim 10, wherein in the second mode, the first area and the second area display an image that has black gradation, the third area displays an image that has at least one of red, blue, green, and a color formed by mixing the red, blue, and green.

12. The display apparatus of claim 10, wherein in the second mode, power is not supplied to a portion of the display panel corresponding to the first area and the second area, power is supplied to a portion of the display panel corresponding to the third area.

13. The display apparatus of claim 10, wherein, when switching from the first mode to the second mode, a gradation of each of the first area and the second area is reduced, and a gradation of the third area is maintained.

14. The display apparatus of claim 10, wherein in the first mode, a first image is displayed in the first area, a second image is displayed in the second area, and a third image is displayed in the third area, wherein in the second mode, a first transformed image formed by changing a size of the first image is displayed in the third area, a second transformed image formed by changing a size of the second image is displayed in the third area, and a third transformed image formed by changing a size of the second image is displayed in the third area.

15. The display apparatus of claim 14, wherein a second information formed by the first transformed image, the second transformed image, and the third image is substantially the same as but compressed with respect to a first information formed by the first image, the second image, and the third image.

16. The display apparatus of claim 10, wherein when switching from the first mode to the second mode, a size of a first image to be displayed in the first area is changed and the size changed first image is displayed in the third area, and a size of a second image to be displayed in the second area is changed and the size changed second image is displayed in the third area.

17. The display apparatus of claim 10, wherein the first reference angle value and the second reference angle value are acute angles.

18. The display apparatus of claim 10, wherein a second bending angle formed by the second area and the third area with respect to the second bending line is an obtuse angle.

* * * * *